US012714122B2

(12) United States Patent
Bessaies-Bey et al.

(10) Patent No.: US 12,714,122 B2
(45) Date of Patent: Aug. 25, 2026

(54) REDUCED EMULSIFIER OR EMULSIFIER-FREE CHOCOLATE

(71) Applicant: Cargill, Incorporated, Wayzata, MN (US)

(72) Inventors: Hela Bessaies-Bey, Metz (FR); Stephane Debon, Brussels (BE); Fabien Declercq, Le Grand Madieu (FR); Janine Deou, Meaux (FR); Nicolas Roussel, Paris (FR); Paul Smith, Waterloo (BE); Joel Wallecan, Ternal (BE)

(73) Assignee: Cargill, Incorporated, Wayzata, MN (US)

( * ) Notice: Subject to any disclaimer, the term of this patent is extended or adjusted under 35 U.S.C. 154(b) by 585 days.

(21) Appl. No.: 17/999,721

(22) PCT Filed: May 27, 2021

(86) PCT No.: PCT/US2021/034485
§ 371 (c)(1),
(2) Date: Nov. 23, 2022

(87) PCT Pub. No.: WO2021/242998
PCT Pub. Date: Dec. 2, 2021

(65) Prior Publication Data

US 2023/0276822 A1 Sep. 7, 2023

(30) Foreign Application Priority Data

May 28, 2020 (EP) .................................... 20177019

(51) Int. Cl.
*A23G 1/40* (2006.01)
*A23G 1/36* (2006.01)
*A23G 1/48* (2006.01)

(52) U.S. Cl.
CPC ................. *A23G 1/40* (2013.01); *A23G 1/36* (2013.01); *A23G 1/48* (2013.01)

(58) Field of Classification Search
None
See application file for complete search history.

(56) References Cited

U.S. PATENT DOCUMENTS

| | | | |
|---|---|---|---|
| 6,391,373 | B1 | 5/2002 | Kaiser |
| 2007/0269493 | A1 | 11/2007 | Lang |

FOREIGN PATENT DOCUMENTS

| | | | | | |
|---|---|---|---|---|---|
| CA | 2208422 | A1 | | 2/2006 | |
| EP | 1061813 | B1 | | 6/2006 | |
| JP | 2007289071 | A | | 11/2007 | |
| WO | WO-8808253 | A | * | 11/1988 | ............... A23G 1/36 |
| WO | 9945789 | W | | 9/1999 | |
| WO | 9945790 | W | | 9/1999 | |
| WO | 1999045790 | A1 | | 9/1999 | |

OTHER PUBLICATIONS

Lees and Jackson-Leonard Hill books—chocolate composition—pp. 124-125 (Year: 1973).*
JFS E: Food Engineering and Physical Properties Impact of Particle Size Distribution on Rheological and Textural Properties of Chocolate Models with Reduced Fat Content T-A.L. Do,J.M.Hargreaves,B. Wolf,J.Hort, and J.R. Mitchell.
Larrard, F. Concrete Mixture Proportioning: a scientific approach, E&FN SPON: An imprint of Routledge, London and New-York, 1999. ISBN 0 419 23500 0.
Annika Feichtinger, Elke Scholten and Guido Sala, Effect of particle size distribution on rheological properties of chocolate, Royal Society of Chemistry, Food & Function, Food Funct., 2020, 11, 9547.
Gonçalves, E.V.; Lannes, S. C. d. S Food Sci. Technol. 2010, 30, 845-851.
Amazon [Online], Dec. 1, 2018 [Search date Jan. 16, 2024], Internet <URL:https://amzn.asia/d/52ormZG>.
Eur. Food Res. Technol., 2014, vol. 238, pp. 139-147.
International Journal of Food Properties, 2000, vol. 3. No. 1, pp. 137-147.
Journal of Food Engineering, 2002, vol. 51, pp. 201-208.
Journal of Food Science, 2007, vol. 72, No. 9, pp. E541-E552.
Kyodo Natural Foods Center [Online], Nov.4, 2010 [Search date Jan. 16, 2024], Internet <URL:https://www.setagaya-1.com/center/_pc/?f=detail_goods&goods=4138>.

* cited by examiner

*Primary Examiner* — Jyoti Chawla

(57) ABSTRACT

A reduced emulsifier or emulsifier-free chocolate composition and a method of manufacturing a reduced emulsifier or emulsifier-free chocolate composition. The reduced emulsifier or emulsifier-free chocolate compositions have a maximum packing fraction greater than that of an equivalent, traditionally manufactured chocolate, whilst having substantially the same viscosity as the equivalent, traditionally manufactured chocolate, in order to provide a healthier alternative.

19 Claims, 7 Drawing Sheets

REDUCED EMULSIFIER OR EMULSIFIER-FREE CHOCOLATE

CROSS-REFERENCE TO RELATED APPLICATIONS

This application is a national phase of International Application No. PCT/US2021/034485, filed May 27, 2021, which claims the benefit of European Application No. 20177019.5, filed May 28, 2020, each of which is incorporated by reference herein in its entirety.

FIELD OF THE INVENTION

The present invention relates to a reduced emulsifier or emulsifier-free chocolate composition and to a method of manufacturing a reduced emulsifier or emulsifier-free chocolate composition. In particular, the present invention relates to reduced emulsifier or emulsifier-free chocolate compositions having a maximum packing fraction greater than that of an equivalent, traditionally manufactured chocolate, whilst having substantially the same viscosity as the equivalent, traditionally manufactured chocolate, in order to provide a healthier alternative.

BACKGROUND

Emulsifiers are commonly added to chocolate to enhance the rheological properties. These emulsifiers help to coat the solid particles in chocolate to allow them to flow. Some examples of emulsifiers typically used in chocolate are lecithin produced from soya, sunflower or rapeseed, ammonium phosphatide and poly glycerol poly ricinoleic acid (PGPR). Emulsifiers may also be selected, for example to produce special shaped sweets or to reduce the formation of the white mould-like spots on chocolate known as chocolate bloom.

However, there are drawbacks to using emulsifiers. For example, higher dosages of emulsifiers can cause off-flavours and difficulties in processing the chocolate. There are also legal restrictions on the amount of emulsifiers that can be used in some jurisdictions. Also, there is an increasing preference amongst consumers for "healthier", so-called clean label or label friendly, food products having fewer additives. Some emulsifiers are controversial because they have purportedly been linked to negative side-effects including bowel inflammation and disease, colorectal cancer, and allergies. Emulsifiers derived from certain plants are also subject to ethical and legal concerns relating to genetically modified crops.

There is therefore a demand for chocolate products that are emulsifier-free or have a reduced emulsifier content compared to traditional chocolate products.

The viscosity of chocolate is key to the intended application. Generally speaking, the less fat and/or emulsifier a chocolate contains, the thicker and more viscous the molten chocolate will be. This may be suitable for extrusion applications, for example, but unsuitable for enrobing or moulding applications as it will be difficult to process. For instance, it is mechanically difficult to apply a thin coating of chocolate to a confectionery product if the chocolate is too thick, and air bubbles may not rise from a viscous chocolate before setting occurs, thereby negatively affecting the appearance and texture of the finished product. The effect of emulsifiers on viscosity is typically greater than the effect of fat. Taking lecithin as an example, 0.5% of lecithin is said to be equivalent to 5% cocoa butter, therefore reducing the amount of lecithin could be expected to result in the chocolate being 10 times more viscous than if the fat were reduced by the same amount.

Based on this traditional knowledge, the expectation is that reducing or eliminating emulsifiers from chocolate would have a substantial negative impact on chocolate viscosity and other rheological characteristics. To counter this effect, more fat would need to be added to the formulation (e.g. 10 times more in the case of lecithin), which would be very undesirable for health and cost reasons.

Chocolate is a dispersion of solid particles (e.g. sugar, milk powders, and cocoa solids) in a continuous fat phase. The effect of the particle size distributions of these solid particles on the rheological characteristics of chocolate has been studied previously. For example, EP1061813 discloses rheologically modified confectioneries that have a total fat content of 16 to 35%, produced by employing particular particle size distributions. The objective in EP1061813 was to improve the packing density of the solid particles. However, the particle packing achieved was in fact poor as the authors failed to take intrinsic features such as particle shape into account. The maximum packing fraction, as determined by the methods described herein, of the product described in EP1061813 is only around 0.54 (see example 4 herein). This means that there would still be large spaces between the solid particles that are filled with expensive cocoa butter. As a result, the chocolate described therein is not cost effective to produce and would have poor rheological characteristics. In addition, the chocolate described in EP1061813 contains emulsifiers, so it necessarily suffers from the drawbacks mentioned above.

There remains a need for an emulsifier-free or reduced emulsifier alternative to traditional chocolate, which avoids or ameliorates the aforementioned disadvantages. The present invention seeks to fulfil this need by tuning the morphological parameters of the solid particles in chocolate to allow for a decrease in emulsifier content by increasing the solid phase volume, whilst accurately controlling the rheological behavior of the chocolate. The compositions and methods described herein can be used to produce chocolate compositions suitable for a variety of applications. The composition of the present invention has similar rheological properties to an equivalent conventional chocolate composition, whilst providing an advantageous reduction in emulsifiers.

STATEMENTS OF INVENTION

In one aspect, the invention provides a reduced emulsifier or emulsifier-free chocolate composition comprising:

- a continuous fat phase, said fat phase comprising a fat and optionally an emulsifier; and
- at least two particulate materials distributed throughout said fat phase;

wherein the at least two particulate materials have different D50 particle sizes to each other, said difference being a factor of 6-8.

The reduced emulsifier or emulsifier-free chocolate composition may have a solid phase volume x, and a Bingham plastic viscosity value y in Pa·s at 40° C. or above, where:

x is from 0.4 to 0.7; and $$y<264x^3-330x^2+141x-20.$$

The reduced emulsifier or emulsifier-free chocolate composition may have a maximum packing fraction that is greater than or equal to 0.72 for extrusion applications, greater or equal to 0.63 for moulding applications, greater than or equal to 0.64 for enrobing applications, or greater or equal to 0.66 for ice cream applications.

The reduced emulsifier or emulsifier-free chocolate composition may have a Bingham plastic viscosity value of between 0.1 and 10 Pa·s and a Bingham yield stress of between 1 and 150 Pa, at 40° C.

In another aspect, the invention provides a method of preparing a reduced emulsifier or emulsifier-free chocolate composition the method comprising:

(a) providing an initial chocolate composition comprising a continuous fat phase, said fat phase comprising a fat and optionally an emulsifier; and
 at least two particulate materials dispersed throughout the fat phase and the emulsifier;
(b) optionally measuring the maximum packing fraction and viscosity of the initial chocolate composition; and
(c) preparing a reduced emulsifier or emulsifier-free version of the initial chocolate composition by:
 i. determining optimized particle packing parameters for the at least two particulate materials of the initial chocolate composition, wherein the optimized particle packing parameters are optimized such that the reduced emulsifier or emulsifier-free chocolate composition has a maximum packing fraction value that is greater than the maximum packing fraction value of the initial chocolate composition and a viscosity that is substantially identical to the viscosity of the initial chocolate composition;
 ii. selecting for the reduced emulsifier or emulsifier-free chocolate composition at least two particulate materials that are identical to the at least two particulate materials of the initial chocolate composition but for having optimized the particle packing parameters; and
 iii. combining the selected particulate materials with a fat phase and optionally an emulsifier that are identical to the fat phase and emulsifier of the initial chocolate composition to provide a reduced emulsifier or emulsifier-free version of the initial chocolate composition.

The particle packing parameters may include particle size distribution, particle shape, and/or the relative amounts of the at least two particulate materials.

The optimized particle packing parameters may be optimized such that the reduced emulsifier or emulsifier-free chocolate composition has a maximum packing fraction that is at least 1% greater than the maximum packing fraction of the initial chocolate composition.

The optimized particle packing parameters may be determined using mathematical modelling. Preferably, the mathematical model used is the compressible packing model described herein.

In a further aspect, the invention provides a reduced emulsifier or emulsifier-free chocolate composition obtained or obtainable by the method of the invention.

The at least two particulate materials may be selected from the group consisting of sugars, cocoa solids, milk solids, bulking agents, calcium carbonate, nutritional particles, and flavorings and/or mixtures of two or more thereof.

The fat phase may comprise or consist of cocoa butter, cocoa butter equivalents, cocoa butter alternatives, anhydrous milk fat, fractions thereof and/or mixtures of two or more thereof.

If present, the emulsifier may be selected from the group consisting of: lecithin, soy lecithin, polyglycerol polyricinoleate (PGPR), ammonium phosphatide (AMP), sorbitan tristearate, sucrose polyerucate, sucrose polystearate, phosphated mono-di-glycerides/diacetyl tartaric acid of mono glycerides.

In another aspect, the invention provides a food product comprising a reduced emulsifier or emulsifier-free chocolate composition according to the invention.

DETAILED DESCRIPTION

Figure 1:
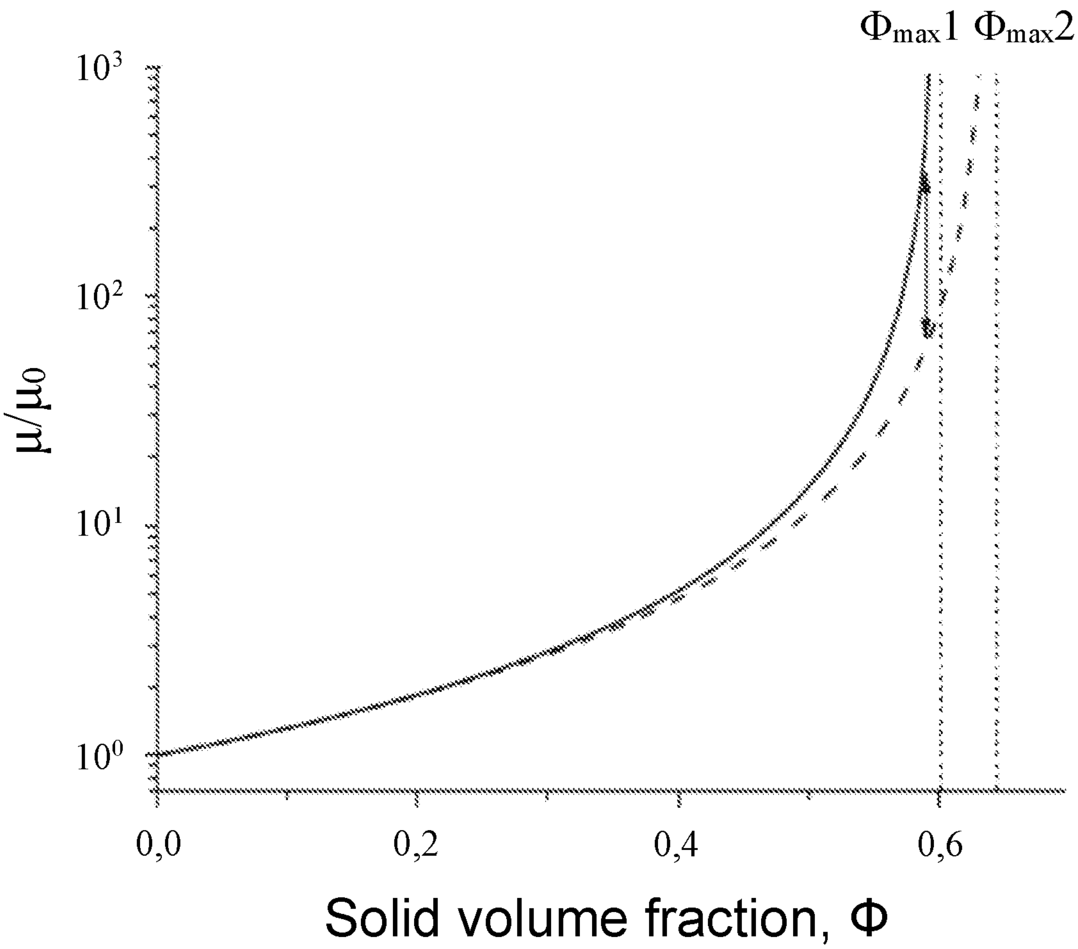
FIG. 1 is a graph showing the relationship between viscosity and solid phase volume for a generic solution.

Unless otherwise specified, all terms should be accorded a technical meaning consistent with the usual meaning in the art as understood by the skilled person.

All ratios, amounts, and percentages in the present description are relative to the total weight of the chocolate composition, unless otherwise specified.

All parameter ranges include the end-points of the ranges and all values in between the end-points, unless otherwise specified.

When used in these specification and claims, the terms "comprises" and "comprising" and variations thereof mean that the specified features, steps or integers are included. The terms are not to be interpreted to exclude the presence of other features, steps or components.

Chocolate Composition

The present invention provides a method of preparing an emulsifier-free or reduced emulsifier chocolate composition. As used herein, the term "chocolate composition" refers to any composition comprising cocoa solids (as defined below) in any amount, notwithstanding that in some jurisdictions chocolate may be legally defined by the presence of a minimum amount of cocoa solids and/or compounds that comprise cocoa butter or cocoa butter substitutes. Advantageously, the term chocolate composition refers to a composition that meets a legal definition of chocolate in any jurisdiction (preferably the US and/or EU) and also includes any product (and/or component thereof) in which all or part of the cocoa butter is replaced by cocoa butter equivalents, replacers, or substitutes. The term chocolate composition may also refer to chocolate compositions comprising cocoa butter and edible solids other than cocoa solids and to "chocolate-like" compositions comprising a suspension of edible solids in a continuous fat phase other than cocoa butter (e.g. Caramac®). The term chocolate composition may refer to an entire food product and/or a component thereof. The chocolate may be a dark, milk, or white chocolate or variants thereof known to the person skilled in the art. The chocolate composition may be suitable for various applications, including but not limited to extrusion, moulding, enrobing, coating, dipping (e.g. for dipping ice-cream), spraying, making chocolate bars, chunks, chips, crumbs, vermicelli and/or sprinkles.

The term "emulsifier-free" means that no emulsifier is added to the composition. The term "reduced emulsifier composition" means that the chocolate composition has a lower total amount of added emulsifiers and/or fewer types of emulsifiers relative to an initial chocolate composition. The reduced emulsifier composition may comprise only a negligible amount of added emulsifiers. In this context, non-limiting examples of emulsifiers that may be added are lecithin, soy lecithin, polyglycerol polyricinoleate (PGPR), ammonium phosphatide (AMP), sorbitan tristearate, sucrose polyerucate, sucrose polystearate, phosphated mono-diglycerides/diacetyl tartaric acid of mono glycerides. The added emulsifier may comprise phospholipids in any amount, for example 30% or greater, 40% or greater, 50% or greater, 60% or greater, 70% or greater, 80% or greater, 90% or greater, or 100%.

The initial chocolate composition is the starting material for the method of the invention and may comprise any existing chocolate composition as defined above, which may be commercially available or purpose-made. The objective of the method is to obtain a reduced emulsifier or emulsifier-free chocolate composition that can be used as an alternative to the initial chocolate composition, i.e. to obtain a reduced emulsifier or emulsifier-free version of the initial chocolate composition.

The reduced emulsifier or emulsifier-free chocolate composition that may be obtained or obtainable by the method of the present invention comprises at least two particulate materials dispersed throughout a continuous fat phase. In molten form, the particulate materials are suspended in the fat phase of the composition, which is in a liquid state. Preferably, the particulate materials are distributed substantially homogenously throughout the fat phase.

Fat Phase

The fat phase of the reduced emulsifier or emulsifier-free chocolate composition may comprise any fat which is suitable for chocolate making, including, but not limited to cocoa butter, cocoa butter alternatives (including equivalents, replacers, and substitutes), vegetable fats, anhydrous milk fat, fractions thereof and/or mixtures of two or more thereof. Preferably, the fat phase consists of a fat or fats suitable for chocolate making.

Preferably, the fat phase comprises cocoa butter. This cocoa butter in the fat phase is also referred to herein as "added cocoa butter" or "added fat" to distinguish it from cocoa butter that may be intrinsic to some cocoa solid containing ingredients as discussed below.

In one non-limiting example, the added cocoa butter is present in the chocolate composition in an amount of from 0% to 40% by mass relative to the total mass of the chocolate composition. Preferably, from 5% to 35%, more preferably from 10% to 30%, more preferably from 15% to 25%.

The total fat content of the reduced emulsifier or emulsifier-free chocolate composition comprises added fat in the fat phase as well as any fat that may be part of the particulate ingredients (e.g. in full-fat cocoa powder). The total fat content of the chocolate composition according to the present invention may be the same as or less than the total fat content of the initial chocolate composition.

The fat phase either does not comprise any added emulsifiers or else contains a reduced amount of emulsifiers relative to the initial chocolate composition. It was surprisingly found that the rheological properties of the chocolate composition are sufficiently controlled by manipulating and optimizing particle packing properties, so that an emulsifier is not required or less emulsifier is required to provide the desired viscosity.

Particulate Materials

The reduced emulsifier or emulsifier-free chocolate composition comprises at least two particulate materials, which are distributed (e.g. homogeneously) throughout a fat phase.

The at least two particulate materials are selected from the group consisting of sugars, cocoa solids, milk solids, bulking agents, calcium carbonate, nutritional particles (e.g. vitamins, minerals, and/or nutraceutical compositions), flavourings (e.g. vanilla, spices, coffee, salt, etc.), non-visible inclusions, and/or any other edible solid particles suitable for use in confectionery, and any combination thereof.

The term "sugar" as used herein refers to any type of sweetener or sweetener containing formulation which is suitable for use in food. Non-limiting examples of sugars that may be used in the present invention include monosaccharides, such as glucose, dextrose, fructose, allulose or galactose; disaccharides such as sucrose, lactose or maltose; polyols such as sorbitol, mannitol, maltitol, xylitol, erythritol, or isomalt; high intensity sweeteners, such as Stevia®; honey, agave syrup, maple syrup, and combinations of two or more thereof.

Advantageously, the sugar is sucrose. The term "sucrose" as used herein includes sucrose in various forms including but not limited to standard (e.g. granulated or crystalline) table sugar, powdered sugar, caster sugar, icing sugar, sugar syrup, silk sugar, unrefined sugar, raw sugar cane, and molasses.

Advantageously, the sugar is a formulation comprising crystalline sugar dispersed in cocoa butter, hereafter referred to as "sweet fat", prepared according to example 1 below. Sweet fat is essentially chocolate without cocoa or dairy-free white chocolate.

In one non-limiting example, the chocolate composition comprises sugar in any amount between 1% and 65% by weight relative to the total weight of the chocolate composition, for example between 5% and 60%, or between 10% and 55%, or between 15% and 50%, or between 20% and 45%, or between 25% and 40%, or between 30% and 35%. Preferably, sugar is included in an amount of from 40% to 60%, or preferably from 45% to 60%, or preferably from 50% to 55%.

As used herein, particle size (also referred to as "granulometry") is defined using the D50 value. The D50 value is a common method of describing particle size distribution, and is sometimes referred to as the "average" or "mean" particle size. "D50" refers to the value of the maximum particle dimension (for example, the diameter for a generally spherical particle) where 50% of the volume of the particles in the sample have a maximum particle dimension below that value. In other words, in a cumulative distribution of the maximum particle dimension in a sample of particles, 50% of the distribution lies below the D50 value.

"Maximum dimension" or "maximum particle dimension" refers to the longest cross-sectional dimension of any particular particle, e.g. a cocoa solid particle or particle of sugar.

The D50 value may be measured using the method described herein using a laser light diffraction/scattering particle size analyser (e.g. Malvern Mastersizer 3000 as sold by Malvern Panalytical Ltd.), or using other known methods.

The sugar used in the present invention may be "coarse sugar" having a D50 particle size of greater than 50 μm, or it may be "fine sugar" having a D50 particle size of from 1 μm to 15 μm, or preferably from 7 μm to 13 μm, or preferably from 8 μm to 12 μm, or preferably around 10 μm. In a preferred embodiment, the fine sugar is sugar in the form of sweet fat (as defined above) having a D50 particle size of between 9 μm and 11 μm. In some examples, the sugar may have a bimodal particle size distribution. In that case, the D50 values above may apply to only one of the distributions.

"Cocoa solids", as used herein, refers to solid cocoa particles. Preferably, the cocoa-solids used will be cocoa powder or a cocoa solids containing ingredient such as cocoa liquor or cocoa mass. In the case of such cocoa solids containing ingredients, the term cocoa solids refers only to the solid cocoa particles and not any surrounding fat that may also be present in the ingredients. Preferably, the cocoa solids are standard cocoa powder (with 10-12% fat content), reduced fat or de-fatted cocoa powder (e.g. produced using solvent extraction), or cocoa liquor.

In one non-limiting example, cocoa solids may be present in the chocolate composition in an amount of from 5% to 40% by mass relative to the total mass of the chocolate composition, or preferably from 15% to 25% by mass, or preferably around 20% by mass.

The cocoa solids may be "coarse cocoa solids" having a D50 particle size of from 5 μm to 15 μm, or preferably, from 7 μm to 13 μm, or preferably from 8 μm to 12 μm, or preferably around 10 μm. Alternatively, the cocoa solids may be "fine cocoa solids" having a D50 particle size of from 0.5 μm to 4 μm, or preferably from 1 to 3 μm, or around 2 μm. In some examples, the cocoa solids may have a bimodal particle size distribution. In that case, the D50 values above may apply to only one of the distributions.

Fine sugars and/or fine cocoa solids may be available commercially or they may be produced in a pre-step of the claimed method by applying known processes such as milling, micronizing, or similar to coarse sugar or cocoa solids.

"Bulking agent(s)", also known as "fillers", may be used as a particulate material to influence the organoleptic or rheological properties of the chocolate composition. Any suitable bulking agent known in the art may be used in accordance with the present invention, including soluble and/or insoluble fibres. Non-limiting examples of "insoluble fibre" that may be used in accordance with the present invention are dietary fibres, cereal fibres and/or other plant fibres. Non-limiting examples of "soluble fibre" that may be used in accordance with the present invention are resistant dextrin, resistant/modified maltodextrin, polydextrose, β-glucan, galactomannan, fructo-oligosaccharides, gluco-oligosaccharide, galacto-oligosaccharides, MOS (mannose-oligosaccharides, also known in the art as mannan-oligosaccharides or manno-oligosaccharides), pectin, psyllium, inulin, and resistant starch.

According to the present invention, the at least two particulate materials have different D50 particle sizes to each other. Preferably, the difference is a factor of 3-12, preferably a factor of 5-10, more preferably a factor of 6-8, more preferably a factor of 7. In one example, the D50 particle size of the larger of the at least two particulate materials is at least 7 times greater than the D50 particle size of the smaller of the at least two particulate materials. In another example, the D50 particle size of the largest of the at least two particulate materials is at least 7 times greater than the D50 particle size of the smallest of the at least two particulate materials. Where three or more particulate materials are present in the chocolate composition the difference between the D50 particle size of each of the three or more particulate materials is at least a factor of 7.

Preferably, the at least two particulate materials are selected from the group consisting of sugars and cocoa solids. Where sugars and cocoa solids are present, the sugar particles and cocoa solids may have a different D50 particle size to each other. Alternatively or additionally, the cocoa solids and/or sugar may have a bimodal particle size distribution. In one non-limiting example the first particulate material is coarse sugar, and the second particulate material is fine cocoa solids, or a mixture of fine cocoa solids and coarse cocoa solids. In an alternative non-limiting example, the first particulate material is coarse cocoa solids and the second particulate material is fine sugar, or a mixture of fine sugar and coarse sugar. In another non-limiting example, the first particulate material is coarse cocoa solids contained in cocoa liquor (D50 approximately 10 μm) and the second particulate material is fine cocoa solids contained in cocoa liquor (D50 approximately 1-2 μm). In an alternative non-limiting example, the first particulate material is coarse cocoa powder (D50 approximately 10 μm) and the second particulate material is fine cocoa solids contained in cocoa liquor (D50 approximately 1-2 μm). In another non-limiting example, the first particulate material is coarse cocoa solids contained in cocoa liquor (D50 approximately 10 μm) and the second particulate material is coarse sugar (D50 approximately 50 μm). In another non-limiting example, the first particulate material is coarse cocoa powder (D50 approximately 10 μm) and the second particulate material is coarse sugar (D50 approximately 50 μm).

Relationship Between Maximum Packing Fraction and Viscosity

Molten chocolate is a non-dilute suspension where particles are dispersed in a Newtonian solution of fat and interact hydrodynamically, increasing the viscous dissipations. Dissipation increases with the solid phase volume (Φ) and diverges as the solid phase volume approaches the maximum packing fraction ($\Phi_{max}$) (also referred to as "maximum packing density", "maximum packing efficiency", or "maximum packing volume") as illustrated in FIG. 1.

"Viscosity" as used herein refers to plastic viscosity, which is a standard parameter used in the chocolate making industry. Plastic viscosity is a measure of how easily a material flows once it has started flowing, i.e. how "thin" or "thick" the material is while it is flowing.

Viscosity of a suspension can be described by the Krieger Dougherty model, which is known in the art:

$$\mu = \mu_0\left(1 - \frac{\Phi}{\Phi_{max}}\right)^{-\alpha} \quad (1)$$

Where μ is the suspension viscosity, $\mu_0$ is the viscosity of the suspending fluid (in this case the fat phase), and α is a fitted factor (set at −2 for the purposes of the present disclosure). This empirical model has the advantage of agreeing well with the theoretical predictions of Einstein at low solid phase volume and diverging as quantitatively expected when the solid phase volume tend toward the maximum packing density. This is illustrated by the solid line in FIG. 1.

As shown in equation (1) and in FIG. 1, an increase of the maximum packing density (concretely meaning that $\Phi_{max}$ moves from $\Phi_{max1}$ to $\Phi_{max2}$) allows for a decrease of viscosity (illustrated by the arrow showing the difference between the solid and dashed line) while the solid phase volume is maintained constant. Conversely, increasing the maximum packing density allows for an increase of the solid phase volume (i.e. decreasing the fat content) without affecting the viscosity of the chocolate composition. Thus, the applicant surprisingly found that particle packing density can be manipulated and/or optimized to adjust emulsifier content whilst controlling the rheological properties of chocolate, particularly viscosity.

Particle Packing Parameters

For the present invention, it is desirable to have very close or dense packing of the particulate materials in the chocolate composition, ideally approaching the highest geometrically admissible packing. The packing density is an intrinsic geometric property of a particle system and is influenced by morphological parameters including the particle size distribution and the particle shape.

Particle size distributions that are bimodal (i.e. having two arithmetic modes) or polydisperse (i.e. having more than two arithmetic modes) generally have a higher packing density than those which are monodisperse (i.e. having one arithmetic mode) because particles with variable size can more efficiently fill a given space. Simply put, the space between the coarser particles can be occupied by finer particles in a bimodal or polydisperse system, reducing the size of interstitial voids between the particles. In the context of present invention, this close packing affects the way in which the particles flow past one another, thereby altering the rheological properties, e.g. viscosity, of the system. It was surprisingly found that the rheological properties can be sufficiently controlled by manipulating particle packing such that no emulsifier, or less emulsifier, is required in order to achieve desirable rheological characteristics in the final product.

To optimize particle packing, the particle size distribution of a system must be controlled. Whilst it may be theoretically possible to optimize the particle packing of a simple composition experimentally by mixing different proportions of particles having various particle size distributions using trial and error, this is not practically possible for a complex multi-component system such as chocolate.

Particle shape can also affect particle packing. For example, spheres do not arrange themselves in the same way as cubes, crushed aggregates, or fibres. Previous research has shown that particles with regular shapes and flat surfaces locally arrange themselves better than those with irregular shapes. Particles with a rounder, smoother shape, also generally have higher packing density than particles with a rough surface.

The method of the invention involves determining optimal particle packing parameters for the particulate materials in the initial chocolate composition. The particle packing parameters may include particle size distribution, particle shape, and/or the relative amounts of the at least two particulate materials. This determination involves analyzing the particulate materials in the initial chocolate composition system and calculating or predicting the optimal particle packing parameters for those particulate materials.

This determination of optimal particle packing parameters may be performed using mathematical modelling. For example, variables in the system may be manipulated in a theoretical model to ascertain the effect on the maximum packing fraction, whilst controlling the viscosity parameter. The optimal particle packing parameters are those that result in the highest maximum packing fraction that is theoretically possible.

Unlike models that have been used previously (e.g. in EP1061813) the maximum packing fraction calculation adopted by the inventors, e.g. CPM described below, takes into account both the particle size distribution and the shape of the particles to estimate the packing density. This enables much closer particle packing to be achieved in the reduced emulsifier or emulsifier-free product.

Compressible Packing Model (CPM)

Preferably, the mathematical model used is the compressible packing model (CPM) developed by François de Larrard, which is described in Gonçalves, E. V.; Lannes, S. C. d. S *Food Sci. Technol.* 2010, 30, 845-851 and also described in Larrard, F. Concrete Mixture Proportioning: a scientific approach, E&FN SPON: An imprint of Routledge, London and New-York, 1999. ISBN 0 419 23500 0 (which is incorporated herein by reference in its entirety). This model takes into account both the particle size distribution and the shape of the particles to estimate the maximum packing fraction. CPM is a semi-empirical model developed to describe the packing density achieved by a granular mixture namely concrete. The main principle of the model is that all size classes in the mixture interact with all other sizes classes in the mixture affecting the overall packing density. The model also assumes that for the same material, the shape of a particle is independent on the size classes. The shape coefficient is computed by taking into account the particle size distribution and the maximum packing fraction of each material.

The inventors unexpectedly found that the CPM, which was initially developed for concrete-based materials, can be used to predict and optimize the maximum packing fraction of sugar and cocoa particles. They found that the predicted (by CPM) and measured (by centrifugation measurement method 1 below) maximum packing fractions of different cocoa/sugar mixtures as a function of their composition are equal.

Compressible Packing Model (CPM) is actually an improvement of an old model developed by de Larrard and Storvall in 1986 called the Linear Packing Model (LPM). What makes CPM a better packing model than LPM is the fact that it takes into account a packing index K, which depends on the experimental protocol packing. This index corresponds to the energy used to pack experimentally a system and therefore it makes it possible to have a predictive packing density that is representative of the real one measured experimentally. CPM allows to predict two type of packing namely the real maximum packing fraction and the virtual maximum packing fraction. The real maximum packing fraction corresponds to what is known as random close packing (i.e., the packing of particles under a given amount of compaction energy), which itself corresponds to the experimental maximum packing fraction called $Ø_{max}$ described herein. In the following, $Ø_{max\ predicted}$ will refer to the real maximum packing fraction predicted by CPM and $Ø_{max}$ to real maximum packing fraction measured experimentally. The virtual maximum packing fraction as defined by de Larrard represents the highest maximum packing fraction that can be attainable for a given mixture considering that there is a perfectly ordered packing (i.e., each particle is placed one by one near to each other). It corresponds to what is known as ordered packing density and we will refer to it as $Ø_{virtual}$. In CPM, the real maximum packing fraction predicted ($Ø_{max\ predicted}$) is obtained from the virtual maximum packing fraction ($Ø_{virtual}$) thanks to the packing index K. Another important parameter that CPM takes into account are the particulate interactions generally occurring when two or more powders are mixed together. De Larrard refers to these particulate interactions as geometrical interactions. They defined three possible geometrical interactions and concluded that the most common one is what is called the partial interaction. This interaction can be defined as the interaction occurring between two particles having different size diameters not so far from each other. In the following, we will only focus on binary and polydisperse mixtures whose particles interact partially to describe how the virtual maximum packing fraction and the predicted real maximum packing fraction are calculated in CPM.

The prediction of the virtual maximum packing fraction ($\emptyset_{virtual}$) for a given mixture depends on the particle size distribution by volume (i.e., each size class and its corresponding volume fraction) of each of its components, their experimental maximum packing fraction ($\emptyset_{max}$), the experimental packing index K, and the geometrical interactions occurring between the particles.

Figure 4:
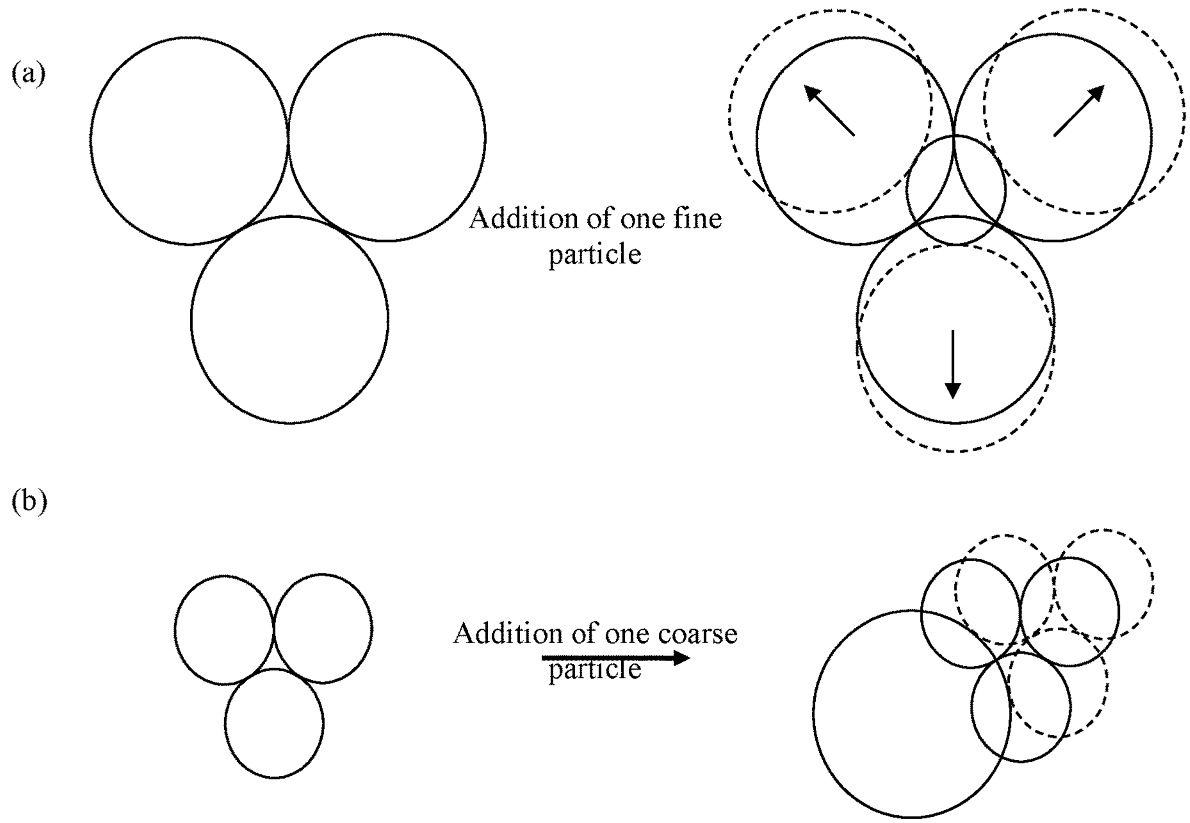
FIG. 4 is a representation of the (a) loosening and (b) wall effects taken into account in the compressible packing model (CPM).

Let's take the example of a binary mixture composed of component 1 (coarse particles) and component 2 (fine particles) to demonstrate how CPM works. Component 1 and 2 have respectively $d_1$ and $d_2$ as particle diameters. CPM assumes that there is at least one dominant diameter in such mixture. Therefore, two different configurations can be distinguished. In the first configuration, the coarse particles diameter is dominant. When one fine particle is inserted into the coarse particles packing, and if the fine particle is not small enough to fill the space between the coarse particles, there is a loosening of the coarse particles packing which induces a de-structuring of the latter. This de-structuring phenomenon is usually referred as "loosening effect" (FIG. 4(*a*)). In the second configuration where the fine particles dominate, when one coarse particle is inserted into the fine particles packing, an increase of the porosity in the vicinity of its surface is observed, leading to another kind of de-structuring phenomenon called "wall effect" (FIG. 4(*b*)). Both effects depend on the geometrical interactions between particles of different size and are considered a linear function of the maximum packing fraction of the dominant component.

In the following, we are detailing how de Larrard includes the effects described above in the virtual maximum packing fraction calculation by studying the same binary system than previously (with $d_1 \geq d_2$) and in which partial interaction between particles arise. In de Larrard's approach, the virtual maximum packing fraction of a binary mixture can be defined as:

$$\phi_{virtual} = \phi_1 + \phi_2$$

where $\emptyset_1$ and $\emptyset_2$ are the partial volumes (i.e., the volume occupied by each component taking into account the presence of the other component). In the following, $y_1$ and $y_2$ represent the volume fractions of component 1 and 2 respectively. $\beta_1$ and $\beta_2$ represent the residual packing fractions of each component taken separately.

By definition:

$$y_1 = \frac{\phi_1}{\phi_1 + \phi_2}$$

$$y_2 = \frac{\phi_2}{\phi_1 + \phi_2}$$

$$y_1 + y_2 = 1$$

When there is a partial interaction between particles, a loosening effect will happen when the coarse particles are dominant while a wall effect will be observed when the fine particles are dominant. Therefore, to calculate the virtual maximum packing fraction, the loosening and wall effects coefficients ($a_{1,2}$ and $b_{1,2}$ respectively) are taken into account.

The loosening effect leads to a decrease of the partial volume $\emptyset_1$ due to the presence of fine particles. And as said previously, this effect is a linear function of the partial volume $\emptyset_2$ because we supposed that the fine particles are sufficiently distant from each other. So, in this case, the virtual maximum packing fraction $\emptyset_{virtual}$ equals to:

$$\phi_{virtual(1)} = \phi_{virtual}$$

$$\phi_{virtual(1)} = \phi_1 + \phi_2$$

$$\phi_{virtual(1)} = \beta_1(1 - a_{1,2}\phi_2) + \phi_2$$

$$\phi_{virtual(1)} = \beta_1 + (\phi_1 + \phi_2)(1 - a_{1,2}\beta_1) + y_2$$

$$\phi_{virtual} = \phi_{virtual(1)} = \frac{\beta_1}{1 - y_2(1 - a_{1,2}\beta_1/\beta_2)}$$

The wall effect leads to a reduction of the volume occupied by the fine particles. Here again, we will assume that the reduction is a linear function of the real maximum packing fraction $\emptyset_{max\ 1}$ if the coarse particles are sufficiently distant from each other. We then write:

$$\phi_{virtual(2)} = \phi_{virtual}$$

$$\phi_{virtual(2)} = \phi_1 + \phi_2$$

$$\phi_{virtual(2)} = \phi_1 + \beta_2\left(1 - \frac{\phi_1}{1 - \phi_1}b_{1,2}\right)(1 - \phi_1)$$

$$\phi_{virtual(2)} = \beta_2 + y_1(\phi_1 + \phi_2)(1 - \beta_2(1 + b_{1,2}))$$

$$\phi_{virtual(2)} = \frac{\beta_2}{1 - y_1(1 - \beta_2 + b_{1,2}\beta_2(1 - 1/\beta_1))}$$

whatever the dominant diameter, $\emptyset_{virtual(1)}$ and $\emptyset_{virtual(2)}$ may be calculated. Therefore, we can state that for any case:

$$\phi_{virtual} \leq \phi_{virtual(1)}$$

$$\phi_{virtual} \leq \phi_{virtual(2)}$$

Then:

$$\phi_1 \leq \beta_1$$

$$\phi_2 \leq \beta_2(1 - \phi_2)$$

These last inequalities are called the impenetrability constraint relative to component 1 and 2 by de Larrard. Therefore, we can conclude from these previous statements, with no more concern about which component is dominant, that:

$$\phi_{virtual} = inf(\phi_{virtual(1)}; \phi_{virtual(2)})$$

The boundary conditions for the coefficients $a_{1,2}$ and $b_{1,2}$ are:

$$a_{1,2} = b_{1,2} = 0 \text{ when } \frac{d_2}{d_1} \ll 1$$

(no interaction between the particles)

$$a_{1,2} = b_{1,2} = 1 \text{ when } \frac{d_2}{d_1} = 1$$

(no interaction between the particles)

Figure 5:
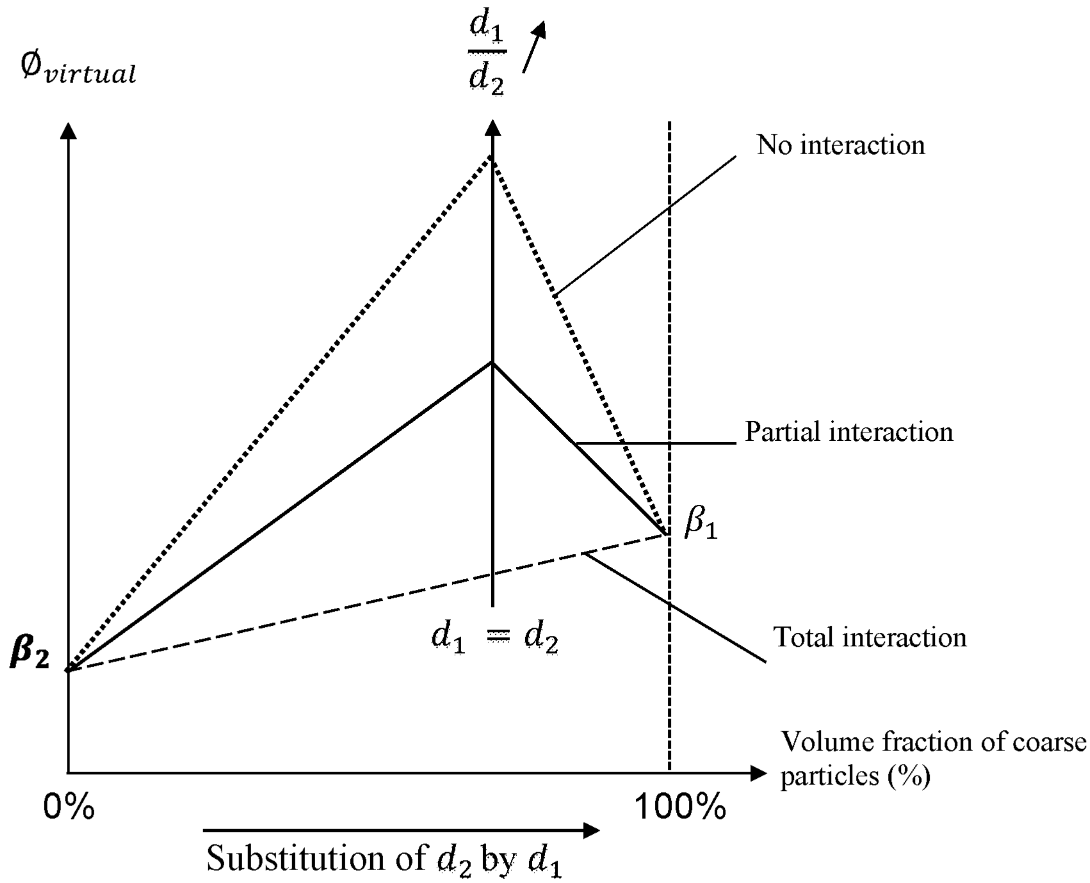
FIG. 5 is a graph showing the evolution of the virtual maximum packing fraction of a binary mixture.

The evolution of the virtual maximum packing fraction ($\varnothing_{virtual}$) considering the particulate interactions is represented in FIG. 5. When there is no or partial interaction, the virtual maximum packing fraction increases until reaching an optimal value and then decreases. Nevertheless, we want to specify that there is not always an optimum when two or more classes are mixed together.

Let's now consider the general case of a ternary mixture in which $d_1 \geq d_2 \geq d_3$. Let's assume that 2 is the dominant component and that 1 exert a wall effect on those of 2 while 3 is exerting a loosening effect on 2. Therefore, $$\phi_{virtual} = \phi_1 + \phi_2 + \phi_3$$

$$y_1 = \frac{\phi_1}{\phi_1 + \phi_2 + \phi_3}$$

$$y_2 = \frac{\phi_2}{\phi_1 + \phi_2 + \phi_3}$$

$$y_3 = \frac{\phi_3}{\phi_1 + \phi_2 + \phi_3}$$

$$y_1 + y_2 + y_3 = 1$$

If we follow the same approach as previously, we can conclude that:

$$\phi_2 = \beta_2\left(1 - a_{2,3}\frac{\phi_3}{1-\phi_1} - b_{2,1}\frac{\phi_1}{1-\phi_1}\right)(1-\phi_1)$$

Then, $$\phi_{virtual} = \phi$$

$$\phi_{virtual} = \frac{\beta_2}{1 - (1 - \beta_2(1 + b_{2,1}))y_1 - (1 - a_{2,3})y_3}$$

$$\phi_{virtual} = \frac{\beta_2}{1 - \left(1 - \beta_2 + b_{2,1}\beta_2(1 - 1/\beta_1)\right)y_1 - \left(1 - a_{2,3}\beta_2/\beta_3\right)y_3}$$

Thanks to the linearity of the equations describing loosening and wall effects, we can easily generalize the equation giving the virtual maximum packing fraction for a polydisperse mixture of n components of different sizes. When i is dominant in a polydisperse mixture, the most general equation for the virtual packing fraction is:

$$\phi_{virtual} = \frac{\beta_i}{1 - \sum_{j=1}^{i-1}(1 - \beta_i + b_{ij}\beta_i(1 - 1/\beta_j))y_j - \sum_{j=i+1}^{n}\left(1 - \frac{a_{ij}\beta_i}{\beta_j}\right)y_j}$$

With:

$$a_{ij} = \sqrt{1 - \left(1 - \frac{d_j}{d_i}\right)^{1.02}}$$

$$b_{ij} = \sqrt{1 - \left(1 - \frac{d_i}{d_j}\right)^{1.5}}$$

We are now considering the real packing fraction of a binary mixture. As already said, there is a packing index K which allows to deduce the real maximum packing fraction from the virtual maximum packing fraction. In de Larrard approach, the expression of the packing index K for a binary mixture is:

$$K = \frac{\frac{y_1}{\beta_1}}{\frac{1}{\phi_{max\ predicted}} - \frac{1}{\phi_{virtual(1)}}} + \frac{\frac{y_2}{\beta_2}}{\frac{1}{\phi_{max\ predicted}} - \frac{1}{\phi_{virtual(2)}}}$$

For a polydisperse mixture with a dominant component i, the expression of the packing index K becomes:

$$K = \sum_{i=1}^{n} K_i = \sum_{i=1}^{n} \frac{\frac{y_i}{\beta_i}}{\frac{1}{\phi_{max\ predicted}} - \frac{1}{\phi_{virtual(1)}}}$$

For monodisperse mixture:

$$K = \frac{1}{\frac{\beta}{\phi_{max\ predicted}} - 1}$$

In order to be able to use the CPM in a practical way, it may be programmed using Microsoft Excel™ as software. The steps of the software programming should follow the de Larrard approach which is clearly described in Gonçalves, E. V.; Lannes, S. C. d. S *Food Sci. Technol.* 2010, 30, 845-851. The software may then be used to determine the optimal particle packing parameters for the initial chocolate composition.

Obtaining Optimized Particulate Materials

Once the optimal particle packing parameters for the initial chocolate composition have been determined, the manufacturer is then able to use this information to produce a reduced emulsifier or emulsifier-free version of the initial chocolate composition which has the same type of particulate ingredients as the initial chocolate composition, but where the characteristics of the particulate materials have been selected or manipulated such that the particle packing parameters of those particulate materials conform as closely as possible to the optimal particle packing parameters previously determined.

In practice, it may not be possible to achieve the absolute optimal particle packing parameters, so we describe the particle packing parameters in the reduced emulsifier or emulsifier-free chocolate composition as being "optimized" rather than necessarily "optimal". Optimized should be understood to mean that the particle packing parameters are as close as practically possible to being optimal, or are absolutely optimal.

In one example, the manufacturer may select the particulate materials for the reduced emulsifier or emulsifier-free chocolate composition by selecting the best combination of particulate materials from an available set of particulate materials taking into account their properties such as particle size distribution and particle shape. In another example, the manufacturer may manipulate available particulate materials by altering their size and/or shape using known methods (e.g. grinding, milling etc.). In either case, the objective is to obtain particulate materials that conform as closely as possible to the optimal particle packing parameters previously determined.

As and when the particle packing parameters are optimized the reduced emulsifier or emulsifier-free chocolate composition has a maximum packing fraction that is greater than the maximum packing fraction of the initial chocolate composition and a viscosity that is substantially identical to the viscosity of the initial chocolate composition. "Substantially identical" viscosity means that the viscosity of the reduced emulsifier or emulsifier-free chocolate composition is the same as that of the initial chocolate composition, or that it differs from that of the initial chocolate composition within an acceptable limit (e.g. ±5%) taking into account the intended application of the reduced emulsifier or emulsifier-free chocolate composition. In other words, the reduced emulsifier or emulsifier-free chocolate composition has a viscosity such that it is suitable for the same application as the initial chocolate composition, and can be used as an alternative, replacement, or substitute for the initial chocolate composition.

In general, it can be verified whether a given chocolate composition is a reduced emulsifier or emulsifier-free chocolate composition produced according to the method of the invention, i.e. whether the particulate materials in the given chocolate composition are optimized in accordance with said method, because if this is so the maximum packing fraction of the given chocolate composition will closely fit the mathematical model used in said method. The maximum packing fraction of a given real-life chocolate composition may be measured using the centrifugation measurement method 1 described herein. Alternatively, if characteristics such as particle size distribution and/or shape of the particulate materials of the given chocolate composition are known, e.g. from literature, the maximum packing fraction of the given chocolate composition may be calculated mathematically by inputting said values into the CPM described above, e.g. using software. The latter is demonstrated in example 3 below.

The applicant has surprisingly found that the emulsifier content can be reduced or eliminated whilst maintaining a substantially identical viscosity when selecting ingredients to achieve the maximum packing fraction calculation.

Exemplary Values for Maximum Packing Fraction, Viscosity, and Yield Stress

The maximum packing fraction of the chocolate composition of the present invention is greater than that of the initial chocolate composition. Preferably, the maximum packing fraction of the chocolate composition of the present invention is at least 1% greater than that of the initial chocolate composition, or more preferably at least 3% greater than the maximum packing fraction of the initial chocolate composition. In non-limiting examples, the maximum packing fraction of the chocolate composition is greater than or equal to 0.60, 0.61, 0.62, 0.63, 0.64, 0.65, 0.66, 0.67, 0.68, 0.69, 0.70, 0.71, 0.72, 0.73, 0.74, or 0.75.

Due to the correlation between maximum packing fraction and viscosity as detailed above with reference to FIG. 1, and the importance of viscosity for chocolate processing, the desired maximum packing fraction of the r chocolate composition may depend on the eventual application of the chocolate composition. For example, the ideal maximum packing efficiency of a chocolate composition for an extrusion application will be different (e.g. higher) than the maximum packing fraction for a chocolate for an enrobing application. For example, the maximum packing fraction may be greater than or equal to 0.72 for extrusion applications, greater than or equal to 0.63 for moulding applications, greater than or equal to 0.64 for enrobing applications, or greater or equal to 0.66 for frozen confectionery (e.g. ice cream dipping) applications. The Bingham viscosity value for the chocolate composition of the invention is between 0.1 to 10 Pa·s. For example, the viscosity may be between 1 and 9 Pa·s, between 2 and 8 Pa·s, between 3 and 7 Pa·s, or between 4 and 6 Pa·s at 40° C.

Viscosity can be measured with the Bingham plastic model. The Bingham plastic model is a two-parameter rheological model widely used to describe the flow characteristics of many types of fluid. It can be described mathematically as follows:

$$\tau = \tau_0 + \mu\dot{\gamma}$$

With:

$\tau$: Shear stress (Pa)

$\tau_0$: Yield stress (Pa)

$\mu$: Plastic viscosity (Pa·s)

$\dot{\gamma}$: Shear rate ($s^{-1}$)

Plastic viscosity is a parameter of the Bingham plastic model. It is the slope of the shear stress/shear rate line above the yield stress.

Yield stress is the minimum stress that should be overcome to initiate flow from rest. The Bingham yield stress of the chocolate composition of the invention is between 1 and 150 Pa at 40° C. For example, the yield stress is between 20 and 130 Pa, or between 40 and 110 Pa, or between 60 and 90 Pa.

The measurement method for viscosity and yield stress is provided in measurement method 2 below.

The emulsifier-free chocolate composition of the invention has a solid phase volume x, and a Bingham plastic viscosity value y in Pa·s at 40° C. or above, where X is from 0.4 to 0.7; and $$y<264x^3-330x^2+141x-20.$$

"Solid phase volume" as used herein, refers to the ratio of the total volume occupied by the particulate materials to the total volume of the molten chocolate composition, which in turn is the sum of the volumes of the solid phase (i.e. particulate materials) and the fat phase.

Method of Manufacture

In one example, the method of the present invention involves selecting, i.e. actively choosing, at least two particulate materials from amongst available particulate materials, that have optimized particle packing parameters as described above. The choice of particulate materials is thus driven by mathematical modelling to optimise the particle packing density as described above. It is important that the at least two particulate materials selected have different average particle sizes in order to enhance packing density.

Since the objective of the method is to produce a reduced emulsifier or emulsifier-free version of an initial chocolate composition, the ingredients (i.e. the particulate materials, fat and emulsifier) selected for use in the reduced emulsifier or emulsifier-free chocolate composition will be of the same type as the ingredients used in the initial chocolate composition except that the particle packing parameters of the particulate materials will be different (optimized). For example, if the initial chocolate composition comprises cocoa solids, sugar, cocoa butter and PGPR, then the reduced emulsifier or emulsifier-free chocolate composition will also contain cocoa solids, sugar, cocoa butter, and PGPR, but the difference is that the cocoa solids and sugar are particularly selected such that the particle packing parameters are optimized.

In another example, the method of the present invention involves manipulating one or more available particulate materials, e.g. by changing their particle size distribution and/or particle shape, so that they possess the optimized particle packing parameters as described above. Non-limiting examples of techniques suitable for performing this manipulation include grinding or milling.

Once the at least two particulate materials have been obtained, either by selection, or manipulation or both, they are combined with the fat phase and the emulsifier (if present) to form a chocolate composition using any known chocolate making techniques.

Preferably, the method does not include a step of adding emulsifier, so that the resulting composition is emulsifier-free. If an emulsifier is used, a smaller quantity of the emulsifier is added relative to the amount of emulsifier in the initial composition. The fat and emulsifier may be combined with the particulate materials separately or simultaneously. In one example, the emulsifier is added to the particulate material/fat mixture. In an alternative example, the emulsifier is added to the fat phase prior to combining with the particulate materials. Fat may be added all at once, or in batches. The combining preferably occurs whilst mixing.

Optionally, the particulate materials may be pre-mixed before combining with the fat phase.

Optionally, the particulate materials may be subjected to a refining process. This may occur at any stage of the method.

The method may also include a conching step.

Food Product

The chocolate composition of the present invention may form all or part of a food product. The food product is preferably a confectionery product. Confectionery products are foodstuffs which are predominately sweet in flavour. Exemplary confectionery products include, but are not limited to, chocolate, chocolate-like materials, fat-continuous filling materials, frozen confectioneries (such as ice cream), chocolate pieces within a frozen confectionery, baked goods such as biscuits, cakes, breads, and pastries, sweets, candies, gummies, sugar confections, tablets, treats, toffees, boiled sweets, bonbons, candy-floss, caramel, fudge, liquorice, marshmallow, nougat, truffles, fondant, ganache. The confectionery product according to the present invention may be the entire food product or it may part of a food product such as a filling, binder, shell or coating, inclusion or decoration for a food product. Any combination of the above alternatives is also encompassed by the present invention.

Preferably, the confectionery product is a chocolate product. In the context of the present invention, the term "chocolate" has the same definition as the term "chocolate composition" (see above definition).

Measurement Methods

1. Measuring Maximum Packing Fraction

The maximum packing fraction of chocolate solids ($\Phi_{max}$) is measured by multi-step centrifugation in a deflocculated state (non-aggregating solids with frictional forces reduced to the minimum via a yield stress optimisation) using an emulsifier, PGPR.

Depending on the recipe (e.g. dark chocolate or milk chocolate), the PGPR dosage requires the measurement of the yield stress versus PGPR concentration.

$$\Phi_{max}=\Phi_{initial}(H_{initial}/H_{equilibrium})$$

$$\text{where: } \Phi_{initial}=V_{solid}/(V_{solid}+V_{fat})$$

and $V_{solid}$ is the volume occupied by the solid particles in the suspension before centrifugation and $V_{fat}$ is the volume occupied by the fat in the suspension before centrifugation.

$H_{initial}$ (also referred to as $H_0$) and $H_{equilibrium}$ are defined below.

The fat in the liquid state is melted cocoa butter and may include emulsifiers and in the case of milk chocolate, fat from whole milk powder.

The solids (i.e. particulate materials) are:

for dark chocolate: sugar (sucrose), cocoa solids (from cocoa liquor)

for milk chocolate: sugar (sucrose), lactose, cocoa solids (from cocoa liquor), whole milk powder, skimmed milk powder, whey powder. Note that in the composition calculation, the fat in whole milk powder (typically 26 wt %) is deduced from the formulation mass and added to the liquid fat phase.

TABLE 1

Density of particulate materials

| Compound | Density (g/mL 2 s.f.) |
|---|---|
| Fat | 0.89 |
| Sugar | 1.59 |
| Cocoa solids fat free | 1.20 |
| Milk powder fat free | 1.34 |
| Whey powder fat free | 1.31 |

Apparatus:

Centrifuge: Sorvall Legend XTR Thermo Fisher Scientific (or Sigma 3-16PK), the measurement temperature is 40° C. (the centrifuge is pre-warmed, see below). The rotor is TX-750 with 4 round buckets, code 7500 6308.

The round bucket accommodates a holder 7500 3638 that can accommodate 7 tubes of 50 mL that is a total of 28 tubes.

50 mL polypropylene centrifuge tubes with seal cap (VWR SuperClear).

RWD 20 Digital IKA stirrer with 4 bladed propeller 07 410 00.

Metal spatula.

Analytical balance to the nearest 0.01 g.

Plastic Pasteur pipettes.

Caliper Mitutoyo UK Ltd. (code 500-123U, model n° CD-15B, serial number 287072) operating with V13GA battery.

Fan-assisted oven set at 50° C. for chocolate melting and conditioning prior to centrifugation.

Fan-assisted oven set at 50° C. for melting chocolate without superfines, set at 60° C. for melting milk chocolate with superfine, set at 80° C. for melting dark chocolate with superfine.

Fine marker pen

Calibrated thermocouple (0.1° C. digital reading)

Materials:

Cocoa butter in the liquid state used for temperature control in the oven and in the centrifuge).

PGPR (stored at 50° C.).

Chocolate Melting Method:

For regular chocolate, 50° C. melting overnight is sufficient.

For chocolate with superfine particulates, the dark chocolates are melted overnight at 80° C. and the milk chocolates are melted overnight at 60° C.

After melting, the contents are mixed thoroughly with a RWD 20 Digital IKA stirrer with 4 bladed propeller set at 840 rpm for 5 minutes to ensure that all the particles are randomly and homogeneously dispersed.

From the $\Phi_0$ based on proximate composition (see definition of $\Phi_0$ in the next section), and the target $\Phi_0$, liquid fat needs to be added or removed, taking into account the PGPR dosing (PGPR is considered as fat).

To ensure sufficient sample for Phi max, rheology and PSD, prepare the molten chocolate on a mass scale that is sufficient for 3 centrifuge tubes of 50 mL (filling level~45 mL).

Chocolate Composition and $\Phi_0$:

The target $\Phi_0$ is at least 0.53 for both dark chocolate and milk chocolate because it was found that 0.53 is the value above which the system does not segregate into layers of different particle sizes.

Figure 2:
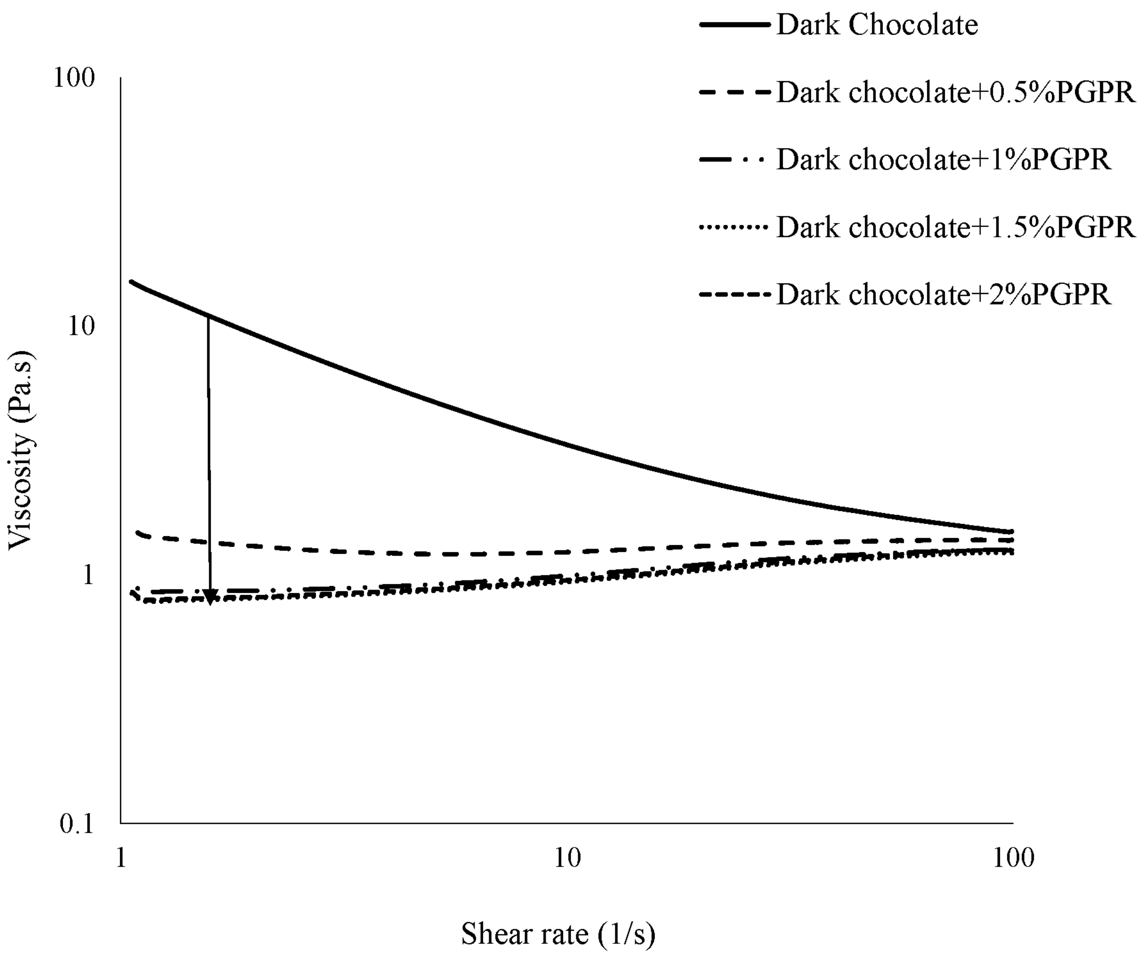
FIG. 2 is a PGPR flow curve for dark chocolate samples.
Figure 3:
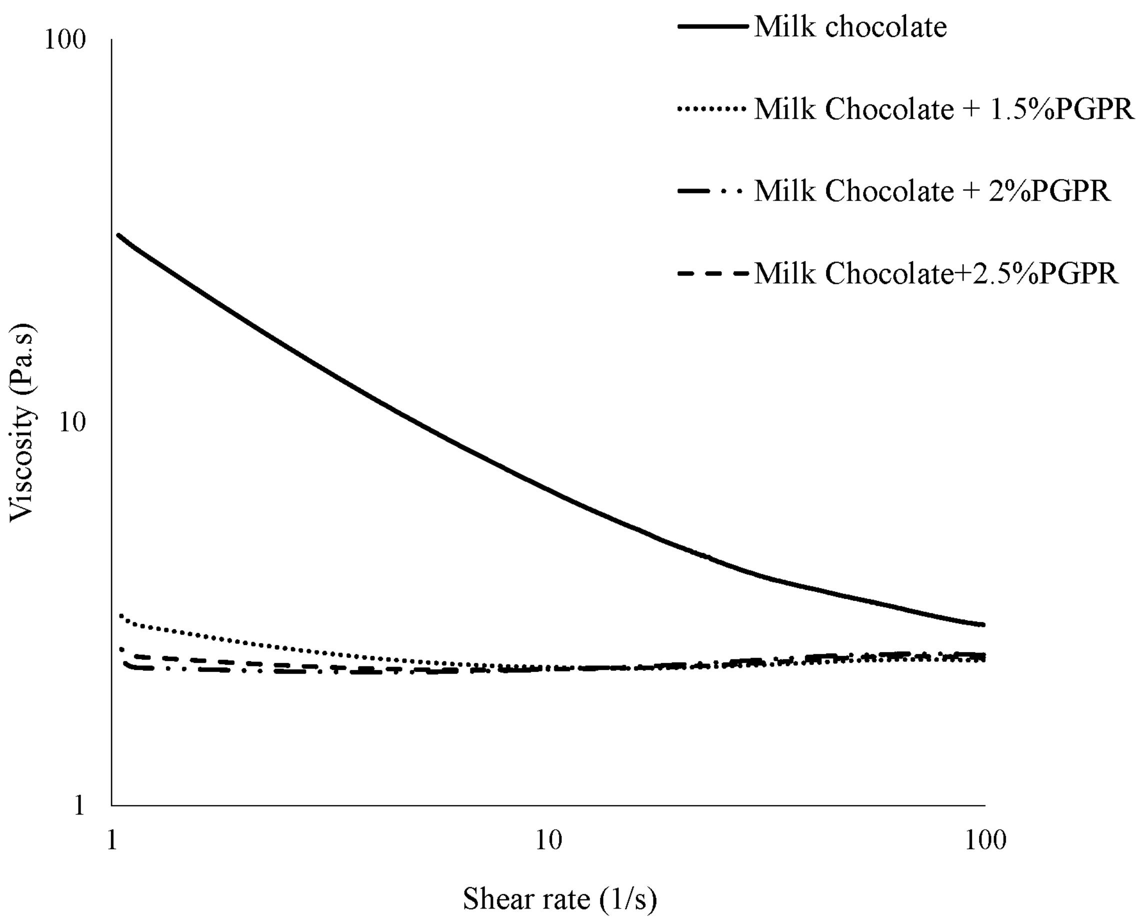
FIG. 3 is a PGPR flow curve for milk chocolate samples.

The PGPR optimal dosage is determined using a flow curve (at 40° C.). Different proportions of PGPR are added to the samples and viscosity and yield stress are measured to obtain a flow curve. The proportions of PGPR added range from 0 to 2.5% (with an increment of 0.5%) per total mass of solid particles. The proportion of PGPR at which the yield stress is the lowest, is the dosage used to deflocculate the sample in order to determine the maximum packing fraction. Without wishing to be bound by theory, the minimum yield stress is used because it corresponds to the yield stress at which the sample is deflocculated, meaning that there is no interaction between the particles. At minimum yield stress, the sample can be considered entirely deflocculated and to measure the maximum packing fraction the system must be in a deflocculated state. Exemplary PGPR flow curves for dark chocolate and milk chocolate respectively are shown in FIGS. 2 and 3.

The optimum PGPR dosage, where the yield stress is at minimum, was found to be 1.5% of total solids for dark chocolate and 2.0% of total solids for milk chocolate.

Depending on the chocolate composition, the initial $\Phi_0$ can be higher or lower than the target $\Phi_0$, in order words, fat may need to be added or removed.

When fat needs to be removed the samples are centrifuged for approximately 1 hour at 4500 rpm. The fat is removed, the PGPR added and the contents are thoroughly mixed with a mixer to give a fluid smooth slurry that is analyzed directly (no incubation needed) for $\Phi_{max}$.

Illustration 1: Dark chocolate: Noir 58 HC5738 AA00 with

Sugar 40.84 w %

Cocoa mass 43.96 w % (composed of 54 w % fat and 46 w % cocoa solids)

Cocoa butter 15.20 w %

TABLE 2

Calculation of PGPR dosage in the initial state
Initial state $\Phi_0$ < 0.53

| Compound | Mass m (g) per 100 g | Volume m/d (mL) | Phase volume |
|---|---|---|---|
| Fat | 15.20 + (43.96 × 0.54) = 38.94 | 43.55 | 0.505 |
| Sugar | 40.84 | 25.76 | 0.495 (initial $\Phi_0$) |
| Cocoa solids | (43.96 × 0.46) = 20.22 | 16.85 | |
| Solids | 61.06 | 42.61 | |
| total | 100.00 | 86.16 | 1.000 |

TABLE 3

Calculation of PGPR dosage in the final state
Initial state $\Phi_0$ < 0.53

| Compound | Mass m (g) per 100 g | Volume m/d (mL) | Phase volume |
|---|---|---|---|
| Fat (including PGPR) | 33.79 | (42.61/0.53) × 0.47 = 37.79 | 0.47 |
| Sugar | 40.84 | 25.76 | 0.53 (target $\Phi_0$) |
| Cocoa solids | 20.22 | 16.85 | |
| Solids | 61.06 | 42.61 | |
| total | 94.85 | (42.61/0.53) = 80.40 | 1.000 |

Per 100 g total mass in the initial state, the quantity of total fat to remove is 5.15 g (38.94–33.79) but this includes PGPR to add that is 0.92 g (1.5%×61.06 g solids).

So 6.07 g fat is first removed after centrifugation then 0.92 g PGPR is added.

Illustration 2: Milk chocolate: Lacte Equilibre HL3435 AA00 with

Sugar 41.86 w %

Cocoa mass 10.77 w % (composed of 54 w % fat and 46 w % cocoa solids)

Cocoa butter 24.64 w %

Whole milk powder 22.73 w % (composed of 26 w % fat and 74 w % defatted milk powder)

TABLE 4

Calculation of PGPR dosage in the initial state
Initial state $\Phi_0$ < 0.53

| Compound | Mass m (g) per 100g | Volume m/d (mL) | Phase volume |
|---|---|---|---|
| Fat | 24.64 + (10.77 × 0.54) + (22.73 × 0.26) = 33.37 | 40.67 | 0.486 |
| Sugar | 41.86 | 26.41 | 0.514 (initial $\Phi_0$) |
| Cocoa solids | (10.77 × 0.46) = 4.95 | 4.13 | |
| Milk powder defatted | (22.73 × 0.74) = 16.82 | 12.53 | |
| Solids | 63.63 | 43.07 | |
| total | 100.00 | 83.74 | 1.000 |

TABLE 5

| Calculation of PGPR dosage in the final state Initial state $\Phi_0 = 0.53$ | | | |
|---|---|---|---|
| Compound | Mass m (g) | Volume m/d (mL) | Phase volume |
| Fat (including PGPR) | 34.15 | (43.07/0.53) × 0.47 = 38.19 | 0.47 |
| Sugar | 41.86 | 26.41 | 0.53 (target $\Phi_0$) |
| Cocoa solids | 4.95 | 4.13 | |
| Milk powder defatted | 16.82 | 12.53 | |
| Solids | 61.06 | 43.07 | |
| total | 95.21 | (43.07/0.53) = 81.26 | 1.000 |

Per 100 g total mass in the initial state, the quantity of total fat to remove is 2.22 g (36.37–34.15) but this include PGPR to add that is 0.95 g (1.5%×63.63 g solids).

So 3.17 g fat is first removed after centrifugation then 0.95 g PGPR is added.

After addition of PGPR, the contents are mixed with the RWD 20 Digital IKA stirrer with 4 bladed propeller set at 840 rpm for 5 minutes. The deflocculated chocolate is ready for centrifugation.

Centrifuge Procedure:

1) Centrifuge Tubes Filling

Put the empty tube in a tube holder where the diameter is slightly higher than the test tube in order to fill the tubes in vertical position, that is without tilting as occurring if holder diameter is too large and tube holder height is too low.

Transfer the PGPR-deflocculated chocolate to the 45 mL mark, close the tube with the screw cap and use the fine marker pen to draw 4 lines on the bottom and on the top. The 4 lines are at the crossing of the 2 diagonals.

The procedure is done on 3 different tubes for an average of 3 replicates.

2) Centrifuge Pre-Warming and Start-Up

The centrifuge is thermostated prior first centrifugation step. The pre-warming takes ~20 minutes and is spinning at 4153 rpm to create a stream of hot air. Therefore, the pre-warming is done without tubes.

The centrifuge has 2 modes for selecting speed/RCF. The operating mode is rotational speed in rpm.

Selecting parameters are:

Acceleration speed 1 (low)

Breaking speed 1 (low)

Temperature 40° C.

TABLE 6

| Centrifugation steps | | | |
|---|---|---|---|
| Centrifugation step | Rotational speed (rpm) | Running time (hour)* | Temperature (° C.) |
| 1 | 1613 | 1 | |
| 2 | 2280 | 1 | |
| 3 | 2593 | 1 | |
| 4 | 4500 | 3 | |
| 5 | 4500 | 1 | |
| 6 | 4500 | 1 | |
| 7 | 4500 | 1 | |

At the end of centrifugation step 5, record the initial height ($H_0$) and the height of the dividing line between solids and fat after the centrifugation process ($H_{equilibrium}$). The initial height is the total height of the mixture that is put into the tube (including both the solid and fat phases). However, the mixture may initially contain air bubbles which will distort the results. Therefore, the measurement of the total height is made after centrifugation so that the bubbles can be removed by the centrifugation and the actual total height can be measured.

Steps 6 and 7 are to check that both heights are constant.

If not, proceed to an extra 1 hour step until constant.

Results:

The maximum packing fraction is:

$$\Phi_{max}=\Phi_0[H_0/H_{equilibrium}]$$

Report the value to the nearest 2 decimal places taking the average of 3 measurements (3 separate 50 mL centrifuge tubes).

2. Measuring Rheological Properties (Plastic Viscosity and Yield Stress)

Apparatus:

C-VOR Bohlin Rheometer equipped with thermostatically controlled water bath at 40° C. The vane geometry is used for the measurements. The Vane tool diameter is 25 mm and its high is 40 mm, the outer cup diameter is 50 mm and its depth is 60 mm.

Turbo-Test Rayneri VMI mixer 600 mL glass beaker (VWR Collection).

Metal spatula.

Analytical balance to the nearest 0.01 g.

Fan-assisted oven set at 50° C. for chocolate melting and conditioning prior sample preparation.

Fan-assisted oven set at 50° C. for sunflower oil warming, set at 60° C. for melting milk chocolate with superfine, set at 80° C. for melting dark chocolate with superfine.

Materials:

Chocolate samples (provided by CARGILL)

Chocolate Melting:

For regular chocolate, 50° C. melting overnight is sufficient.

For chocolate with superfine particulates, the dark chocolates are melted overnight at 80° C. and the milk chocolates are melted overnight at 60° C.

Sample Preparation:

Mix the chocolate sample with a metal spatula when you take it out of the oven.

Pour 150 g into a glass beaker. 150 g is the amount needed to fill the vane geometry.

Then mix it using a turbo-test Rayneri VMI mixer at 840 rpm for 5 minutes. The mixing should be done in a hot water bath in order to have the sample at 40° C. after the 5 minutes.

The rheological measurement must be done immediately after the mixing.

The studied samples are:

Sample1: Mouscron dark chocolate Noir 58 HC5738 AA00 with

- Sugar 40.84 w %
- Cocoa mass 43.96 w % (composed of 54 w % fat and 46 w % cocoa particles)
- Cocoa butter 15.20 w %

Sample2: Mouscron milk chocolate Lacte Equilibre HL3435 AA00 with

- Sugar 41.86 w %
- Cocoa mass 10.77 w % (composed of 54 w % fat and 46 w % cocoa particles)
- Cocoa butter 24.64 w %
- Whole milk powder 22.73 w % (composed of 26 w % fat and 74 w % defatted milk powder)

Measurement Procedure:

The cup of the rheometer was filled with the sample and the measurement sequence was started.

The sample is pre-sheared for 300 s at a speed of 177 $s^{-1}$.

After a rest of 3 s, the sample is subjected to a ramp of decreasing shear rate from 100 $s^{-1}$ to 1 $s^{-1}$ for 500 s then to a ramp of increasing shear rate from 1 $s^{-1}$ to 100 $s^{-1}$ for 500 s.

Choose the linear acquisition to cover the range of shear speed studied.

The sequence of a decreasing then increasing ramp allows us to verify the reproducibility of the measurements, the stability of the sample, and to ensure that the influence of the thixotropy of the system studied on the rheological behaviour is negligible with this protocol.

In the following, we will only study the decreasing curve for data analysis.

Results:

The flow curves are fitted with the Bingham equation.

The analysis procedure is as following:

Plot the apparent viscosity as a function of the shear rate.

Plot the shear stress as a function of the shear rate but only for the decreasing curve, meaning for shear rates from 100 $s^{-1}$ to 1 $s^{-1}$.

Add a linear trend line to the curve in order to have a linear equation as follows: y=ax+b.

The plastic viscosity and yield stress of the sample are given by a and b respectively.

3. Measuring Particle Size Distribution

The particle size distribution of solid particles of chocolate is measured by laser diffractometry (in a deflocculated state).

PGPR is used to disperse the particles in the solvent (i.e. oil). The PGPR dosage required to disperse the particles was determined after several measurements at different dosages (see section PGPR dosage).

Definition of Terms

The calculation of the granulometric distribution is based on the Mie theory.

$d_{10}$, $d_{50}$ and $d_{90}$ are the characteristics diameters obtained from these calculations.

$d_{10}$ is the volume-based diameter below which 10% of the particles are undersize.

$d_{50}$ is the volume-based diameter below which 50% of the particles are undersize.

$d_{90}$ is the volume-based diameter below which 90% of the particles are undersize.

The optical indexes (refractive index and absorption) are required for the granulometric distributions calculation by Mie theory. They are represented by the real and imaginary parts of the complex refractive index of the material, defined by:

$$N=n-ik$$

With n being the real part and depending on the nature of the material. The imaginary part, k, represents the absorption of the light beam by the particle crossed. It also depends on the nature of the material, but also on its purity.

The solid particles are:

for dark chocolate: sugar (sucrose), cocoa particles (from cocoa mass)

for milk chocolate: sugar (sucrose), lactose, cocoa particles (from cocoa mass), whole milk powder, skimmed milk powder, whey powder.

Sunflower oil is used as the solvent.

TABLE 7

Indexes and densities:

| Compound | Density (g/mL) ≥2 decimals | Density (g/mL) 2 decimals | Indexes Absorption (AI) | Indexes Refractive (RI) |
|---|---|---|---|---|
| Sunflower oil | 0.8942[1] | 0.89 | — | 1.46 |
| Sugar | 1.5852 | 1.59 | 0.01 | 1.54 |
| Cocoa solids fat free | 1.20[2] | 1.20 | 0.1 | 1.59 |
| Milk powder fat free | 1.342 | 1.34 | 0.01 | 1.34[2] |
| Whey powder fat free | 1.313 | 1.31 | 0.01 | 1.34[2] |

[1]The sample is pre-sheared to bring it to a reference structuration state.
[2]Temperature to remain at 40° C. during the measurement.

Apparatus:

Laser diffractometer, Mastersizer 3000, equipped with a dispersing unit Hydro LV (Malvern Instruments Ltd., Malvern Panalytical, France).

Turbo-Test Rayneri VMI mixer 25 mL glass bottle with pressure cap (VWR Collection).

Metal spatula.

Analytical balance to the nearest 0.01 g.

Plastic Pasteur pipettes.

Fan-assisted oven set at 50° C. for chocolate melting and conditioning prior sample preparation.

Fan-assisted oven set at 50° C. for sunflower oil warming, set at 60° C. for melting milk chocolate with superfine, set at 80° C. for melting dark chocolate with superfine.

Materials:

Commercial sunflower oil (AUCHAN, France)

Emulsifier: PGPR (provided by CARGILL).

Chocolate samples (provided by CARGILL)

Chocolate Melting:

For regular chocolate, 50° C. melting overnight is sufficient.

For chocolate with superfine particulates, the dark chocolates are molten overnight at 80° C. and the milk chocolates are molten overnight at 60° C.

Sample Preparation:

Add 10 g of melted chocolate in a solution containing 7 g of sunflower oil and 1 g of PGPR.

Mix the suspension during 5 min at 840 rpm with Turbo-Test Rayneri VMI mixer to ensure that all the particles are homogeneously dispersed.

Put the suspension in the oven or a water bath overnight at 50° C.

Put 600 ml of sunflower oil at 50° C. overnight for each measurement.

The studied samples are:

Sample 1: Mouscron dark chocolate Noir 58 HC5738 AA00 with

Sugar 40.84 w %

Cocoa mass 43.96 w % (composed of 54 w % fat and 46 w % cocoa particles)

Cocoa butter 15.20 w %

Sample 2: Mouscron milk chocolate Lacte Equilibre HL3435 AA00 with
Sugar 41.86 w %
Cocoa mass 10.77 w % (composed of 54 w % fat and 46 w % cocoa particles)
Cocoa butter 24.64 w %
Whole milk powder 22.73 w % (composed of 26 w % fat and 74 w % defatted milk powder)

Measurement Procedure:

Enter the parameters required for the measurement (name of the sample, optical indexes of the particles and solvent, shape of the particles . . . ). Make sure to set the software to repeat each measurement 5 times.

Fill the unit cell with the pre-warmed 600 ml sunflower oil and cover the cell.

Poor the sample prepared in the cell until an obscuration between 12-15%.

Measure the particle size distribution.

For dark chocolate samples, two measurements must be done. One measurement using sugar's optical indexes and another one using cocoa's indexes. A particle size distribution by volume is therefore obtained for each measurement.

For milk chocolate samples, the principle is the same but you have to do three measurements instead of two. The third measurement is done with milk's optical indexes.

Results:

Sample 1: Mouscron Dark Chocolate Noir 58 HC5738 AA00

1. Average the particle size distribution by volume obtained from the five successive measurements using cocoa's optical indexes.
2. Average the particle size distribution by volume obtained from the five successive measurements using sugar's optical indexes.
3. Estimate the volume proportions of cocoa and sugar particles in the sample.

Volume Proportion of Sugar ($\alpha$):

$$\alpha = \frac{\text{Volume of sugar}}{\text{Volume of sugar} + \text{Volume of cocoa particles}}$$

Volume Proportion of Cocoa Particles ($\beta$):

$$\beta = \frac{\text{Volume of cocoa particles}}{\text{Volume of sugar} + \text{Volume of cocoa particles}}$$

We recall that:

$$\text{Volume of sugar} = \frac{\text{Mass of sugar}}{\text{Density of sugar}}$$

$$\text{Volume of cocoa particles} = \frac{\text{Mass of cocoa particles}}{\text{Density of cocoa particles}}$$

And mass of cocoa particles=0.46×Mass of cocoa mass

For sample 1 we find:

$$\alpha = \frac{\frac{40.84}{1.59}}{\frac{40.84}{1.59} + \frac{(0.46 \times 43.96)}{1.2}} = 0.60$$

-continued $$\beta = \frac{\frac{(0.46 \times 43.96)}{1.2}}{\frac{40.84}{1.59} + \frac{(0.46 \times 43.96)}{1.2}} = 0.40$$

4. The particle size distribution by volume for dark chocolate is obtained by averaging the average particle size distribution by volume obtained with the optical indexes of cocoa and sugar according to their respective volume proportion.

For Sample 1 at a Fixed Size:

Volume Proportion of Dark Chocolate ($\gamma$):

$\gamma$=($\alpha$×the average particle size distribution by volume obtained with cocoa's optical indexes)+($\beta$×the average particle size distribution by volume obtained with sugar's optical indexes)

Sample 2: Mouscron Milk Chocolate Lacte Equilibre HL3435 AA00

The analysis procedure is the same as the one described previously. However, in this case, milk particles should be considered too. It is therefore necessary to determine their volume proportion.

Volume Proportion of Sugar ($\alpha$):

$$\alpha = \frac{\text{Volume of sugar}}{\text{Volume of sugar} + \text{Volume of cocoa particles} + \text{Volume of milk particles}}$$

Volume Proportion of Cocoa Particles ($\beta$):

$$\beta = \frac{\text{Volume of cocoa particles}}{\text{Volume of sugar} + \text{Volume of cocoa particles} + \text{Volume of milk particles}}$$

Volume proportion of milk particles ($\Phi$):

$$\Phi = \frac{\text{Volume of milk particles}}{\text{Volume of sugar} + \text{Volume of cocoa particles} + \text{Volume of milk particles}}$$

We recall that:

$$\text{Volume of milk particles} = \frac{\text{Mass of milk particles}}{\text{Density of milk particles}}$$

And mass of milk particles=0.74×Mass of whole milk powder

For sample 2 we find:

$$\alpha = \frac{\frac{41.86}{1.59}}{\frac{41.86}{1.59} + \frac{(0.46 \times 10.77)}{1.2} + \frac{(0.74 \times 22.73)}{1.34}} = 0.60$$

$$\beta = \frac{\frac{(0.46 \times 10.77)}{1.59}}{\frac{41.86}{1.59} + \frac{(0.46 \times 10.77)}{1.2} + \frac{(0.74 \times 22.73)}{1.34}} = 0.10$$

-continued $$\Phi = \frac{\frac{(0.74\times 22.73)}{1.59}}{\frac{41.86}{1.59}+\frac{(0.46\times 10.77)}{1.2}+\frac{(0.74\times 22.73)}{1.34}} = 0.29$$

At a Fixed Size:

Volume Proportion of Milk Chocolate (δ):

δ=(α×the average particle size distribution by volume obtained with cocoa's optical indexes)+(β×the average particle size distribution by volume obtained with sugar's optical indexes)+(δ×the average particle size distribution by volume obtained with milk's optical indexes)

EXEMPLARY EMBODIMENTS

The following are exemplary embodiments of the invention.

Exemplary embodiment 1. An emulsifier-free chocolate composition having a solid phase volume x, and a Bingham viscosity value y in Pa·s at 40° C. or above, where:

x is from 0.4 to 0.7; and $$y<264x^3-330x^2+141x-20.$$

Exemplary embodiment 2. A method of preparing a reduced emulsifier or emulsifier-free chocolate composition comprising a continuous fat phase and optionally an emulsifier, the method comprising:

providing an initial chocolate composition comprising at least two particulate materials dispersed throughout the fat phase and the emulsifier;

determining the maximum packing fraction and viscosity of the initial chocolate composition; and preparing a reduced emulsifier or emulsifier-free version of the initial chocolate composition by:

determining optimized particle packing parameters for the at least two particulate materials, wherein the optimized particle packing parameters are optimized such that the reduced emulsifier or emulsifier-free chocolate composition has a maximum packing fraction that is greater than the maximum packing fraction of the initial chocolate composition and a viscosity that is substantially identical to the viscosity of the initial chocolate composition;

selecting the at least two particulate materials having optimized particle packing parameters; and combining the selected particulate materials with the fat phase and optionally the emulsifier to provide a reduced emulsifier or emulsifier-free version of the initial chocolate composition.

Exemplary embodiment 3. A method according to exemplary embodiment 2, wherein the particle packing parameters include particle size distribution, particle shape, and/or the relative amounts of the at least two particulate materials.

Exemplary embodiment 4. A method according to exemplary embodiment 2 or 3, wherein the optimized particle packing parameters are optimized such that the reduced emulsifier or emulsifier-free chocolate composition has a maximum packing fraction that is at least 1% greater than the maximum packing fraction of the initial chocolate composition.

Exemplary embodiment 5. A method according to any one of exemplary embodiments 2-4, wherein the maximum packing fraction is determined using software that predicts maximum packing fraction based on input values of the particle size distribution and/or shape of the particulate materials.

Exemplary embodiment 6. A method according to any one of exemplary embodiments 2-4, wherein the maximum packing fraction ($Ø_{max}$) is determined experimentally by measurement method 1.

Exemplary embodiment 7. A reduced emulsifier or emulsifier-free chocolate composition obtained or obtainable by the method of any one of exemplary embodiments 2-6.

Exemplary embodiment 8. A reduced emulsifier or emulsifier-free chocolate composition according to exemplary embodiment 1 or 7, comprising:

at least two particulate materials dispersed throughout a continuous fat phase, and optionally an emulsifier, the at least two particulate materials having different D50 particle sizes to each other.

Exemplary embodiment 9. A reduced emulsifier or emulsifier-free chocolate composition according to exemplary embodiment 8, wherein the D50 particle sizes of the at least two particulate materials are different to each other by a factor of between 3 and 12.

Exemplary embodiment 10. A reduced emulsifier or emulsifier-free chocolate composition according to any one of exemplary embodiments 1 or 7-9, having a maximum packing fraction that is greater than or equal to 0.72 for extrusion applications, greater or equal to 0.63 for moulding applications, greater than or equal to 0.64 for enrobing applications, or greater or equal to 0.66 for ice cream applications.

Exemplary embodiment 11. A reduced emulsifier or emulsifier-free chocolate composition according to any one of exemplary embodiments 1 or 7-10, having a Bingham viscosity value of between 0.1 and 10 Pa·s and a Bingham yield stress of between 1 and 150 Pa, at 40° C.

Exemplary embodiment 12. A method, reduced emulsifier or emulsifier-free chocolate composition according to any one of the preceding exemplary embodiments wherein the at least two particulate materials are selected from the group consisting of sugars, cocoa solids, milk solids, bulking agents, calcium carbonate, nutritional particles, and flavorings and/or mixtures of two or more thereof.

Exemplary embodiment 13. A method, reduced emulsifier or emulsifier-free chocolate composition according to any one of the preceding exemplary embodiments, wherein the fat phase comprises cocoa butter, cocoa butter equivalents, cocoa butter alternatives, anhydrous milk fat, fractions thereof and/or mixtures of two or more thereof.

Exemplary embodiment 14. A method or reduced emulsifier chocolate composition according to any one of the preceding exemplary embodiments, wherein the emulsifier is selected from the group consisting of: lecithin, soy lecithin, polyglycerol polyricinoleate (PGPR), ammonium phosphatide (AMP), sorbitan tristearate, sucrose polyerucate, sucrose polystearate, phosphated mono-di-glycerides/diacetyl tartaric acid of mono glycerides.

Exemplary embodiment 15. A food product comprising a reduced emulsifier or emulsifier-free chocolate composition according to any one of exemplary embodiments 1 or 7-15.

EXAMPLES

Example 1—Preparation of Sweet Fat

1. A mixture of 11.7 kg (78%) crystal sugar (weight) plus 3.3 kg (22%) liquid cocoa butter is thoroughly mixed using a Stephan mixer
2. This mixture is passed through a triple roll refiner.

3. The flakes obtained are collected.
4. These flakes are passed a second time through the same triple roll refiner;
5. 0.15 kg (1%) of cocoa butter is added to the double ground flakes.
6. This mixture is transferred to a Colette conche (vertical axis).
7. It is conched for 5 hrs at 60° C.

The D50 particle size of the sugar in the sweet fat is 10.86 μm.

Example 2—Emulsifier-Free Chocolate Compositions

Dark chocolate samples for extrusion applications were prepared having the formulations of table 8. Formulation 1 contained an emulsifier but had non-optimized particle packing, formulation 2 did not contain an emulsifier and had non-optimized particle packing, whilst formulation 3 did not contain an emulsifier and had optimized particle packing due to replacement of 30% of the sweet fat with coarse sugar. Viscosity and yield stress of the formulations were measured according to the above methodologies.

TABLE 8

Comparing the effect of maximum packing fraction on viscosity in the presence and absence of an emulsifier.

| Formulation | Sugar (% by total weight) | Coarse cocoa solids (% by total weight) | Fat (cocoa butter) (% by total weight) | Lecithin (% by total weight) | Viscosity (Pa · s) | Yield stress (Pa) |
|---|---|---|---|---|---|---|
| 1 | 58.5 sweet fat | 15.18 | 25.82 | 0.5 | 4 | 95 |
| 2 | 58.5 sweet fat | 15.18 | 25.82 | 0 | 5.5 | 247 |
| 3 | 40.95 sweet fat 17.55 coarse sugar | 15.18 | 25.82 | 0 | 4 | 123 |

The results show that eliminating the emulsifier would normally cause the viscosity to increase, but when particle packing is optimized the emulsifier may be removed without impacting the viscosity.

Example 3—Further Studying the Effect of Replacing Sugar with Coarse Sugar

Further studies were carried out to evaluate the effect on viscosity of replacing sugar with coarse sugar.

Using CPM as described herein, it was mathematically predicted that Φmax would increase until reaching an optimum when 80% of the sugar in formulation 1 was substituted for coarse sugar. Thus, the hypothesis was that in order to avoid an increase in viscosity when formulating without emulsifier it is necessary to substitute at least 80% of the sugar with coarse sugar. This was tested experimentally. The results are shown in table 9.

Formulation 4=No coarse sugar

Formulation 5=40% of the sugar in formula 1 replaced by coarse sugar

Formulation 6=60% of the sugar in formula 1 replaced by coarse sugar

Formulation 7=80% of the sugar in formula 1 replaced by coarse sugar

TABLE 9

Comparing the effect on viscosity of substituting sugar for coarse sugar.

| Formulation | Sugar (% by total weight) | Coarse sugar (% by total weight) | Coarse cocoa solids (% by total weight) | Fat (cocoa butter) (% by total weight) | Lecithin (% by total weight) | Viscosity (Pa · s) | Yield stress (Pa) |
|---|---|---|---|---|---|---|---|
| 4 | 58.5 | 0 | 15.18 | 25.82 | 0.5 | 5.13 | 108.24 |
| 5 | 35.28 | 23.52 | 15.26 | 25.95 | 0 | 7.09 | 222.92 |
| 6 | 23.52 | 35.28 | 15.26 | 25.95 | 0 | 5.83 | 141.65 |
| 7 | 11.76 | 47.04 | 15.26 | 25.95 | 0 | 5.32 | 97.67 |

As expected, formulation 7 (80% coarse sugar) had a viscosity closest to that of formulation 4 (no coarse sugar). Thus, the CPM provides an accurate prediction. Additionally, the substitution of 80% coarse sugar led to a decrease in yield stress in the absence of an emulsifier.

Example 4—Calculation of Maximum Packing Fraction of Chocolate Described in EP1061813

EP1061813 discloses a chocolate in example 5.

The particle size distributions of the particulate materials described in example 5 of EP1061813 were determined by reference to FIG. 2 a of said document.

The density of the skimmed milk powder was not measured. However, in the literature the quoted density is 1.13 kg/m3 (see Walstra P, J T M Wouters and TJ Geurts 2006 Dairy Technology $2^{nd}$ edition CRC/Taylor & Francis, which is herein incorporated by reference.

The ratios (by weight) of the particulate materials disclosed in example 5 of EP1061813 are:

Sugar 68.5%

Skimmed milk powder 25.4%

Cocoa Powder 6.1%

The above values were input into a Microsoft Excel™ spreadsheet that had been programmed to follow the de Larrard approach (CPM) described above and in Gonçalves, E. V.; Lannes, S. C. d. S *Food Sci. Technol.* 2010, 30, 845-851. This output a maximum packing fraction value of 0.54. This value is low relative to the maximum packing fraction values described herein (greater than or equal to 0.60). Without being bound by theory, it is believed that this is because the particle size of the cocoa powder and the skimmed milk powder are very similar in EP1061813.

The ratios of the particulate materials described in EP1061813 were then varied to observe the effect on the maximum packing fraction value. The results are shown in table 13 ($CP_{Mars}$). Varying the ratio had little effect on the maximum packing fraction value.

For comparative purposes, the same ratios were then investigated but the cocoa powder was substituted in the model for a theoretical cocoa powder having a finer particle size of 1.8 μm. These results are also shown in table 13 ($CP_{1.8\ \mu m}$). Substituting the cocoa powder consistently resulted in higher maximum packing fraction values.

TABLE 13

Effect of varying dry ingredient ratios on maximum packing fraction value.

| | $CP_{Mars}$ | $CP_{1.8\mu m}$ |
|---|---|---|
| Sugar 68, SMP* 25, CP** 7 | 0.528 | 0.594 |
| Sugar 76 SMP 19, CP 5 | 0.542 | 0.582 |
| Sugar 67 SMP 28 CP 5 | 0.539 | 0.597 |
| Sugar 65 SMP 25 CP10 | 0.545 | 0.603 |
| Sugar 50 SMP 25 CP 25 | 0.56 | 0.621 |
| Sugar 34 SMP 33 CP 33 | 0.532 | 0.622 |

*SMP = skimmed milk powder
**CP = cocoa powder

Figure 6:
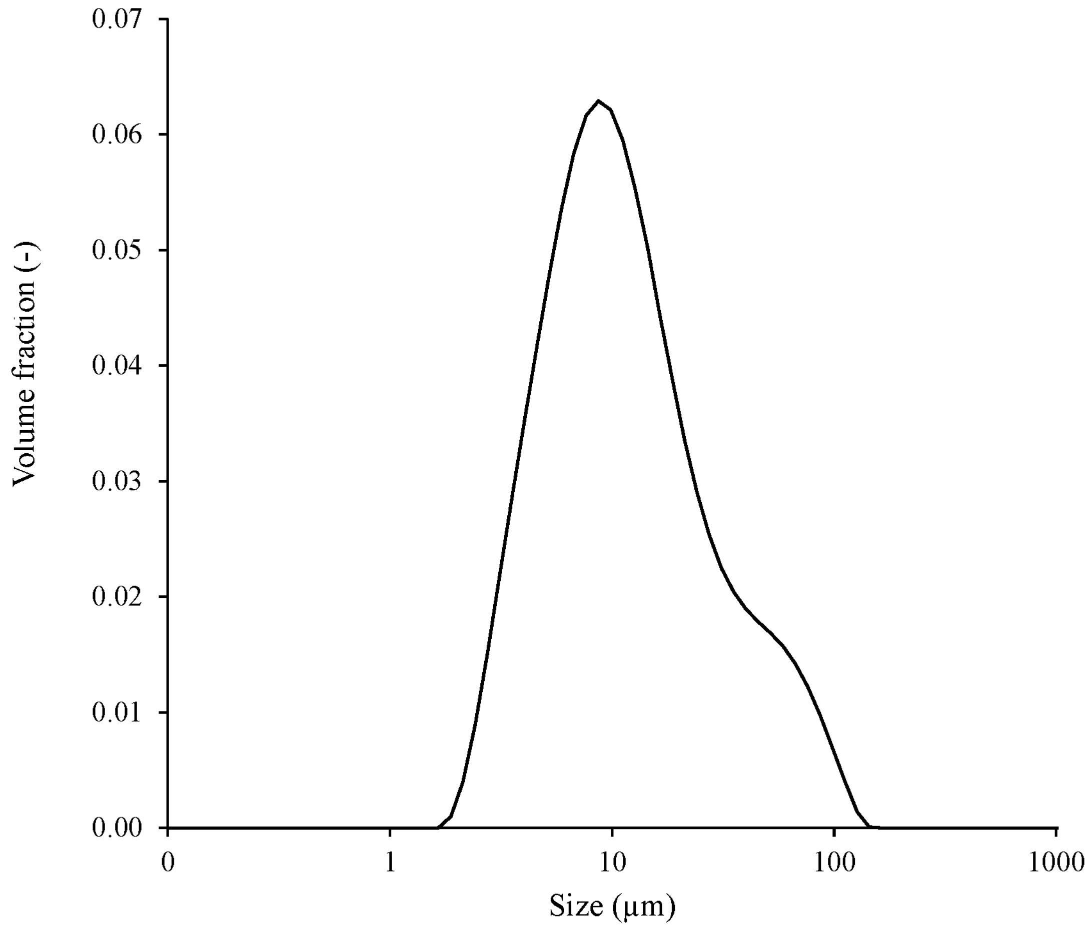
FIG. 6 is a graph showing the particle size distribution of a typical cocoa powder having a maximum packing fraction of 0.49.

Example 5—Effect of Particle Shape on the Maximum Packing Fraction Computed from the Compressible Packing Model A typical cocoa powder having the particle size distribution shown in FIG. 6 (measured by granulometry) and a maximum packing fraction of 0.49 (measured by centrifugation) was studied.

Figure 7:
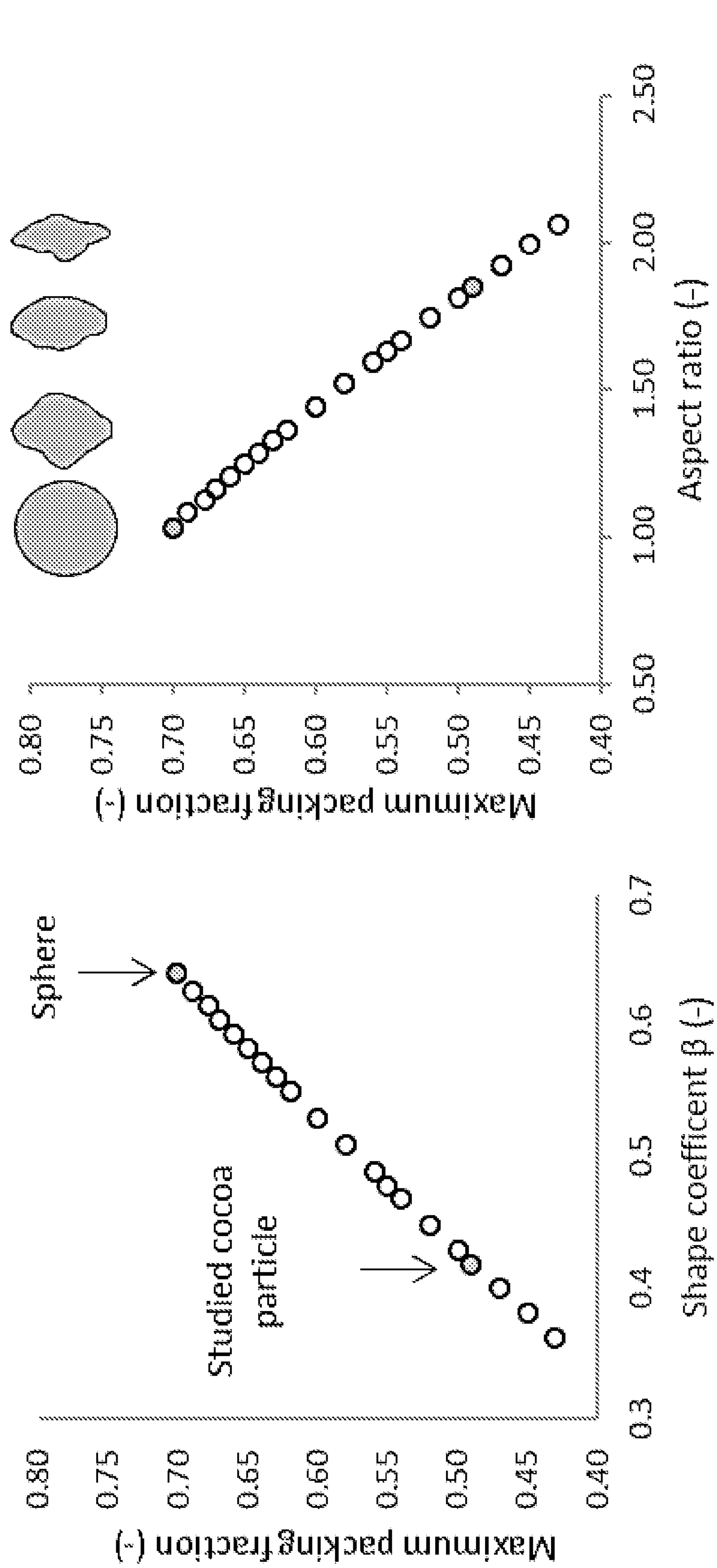
FIG. 7 is a series of two graphs (a) and (b) describing maximum packing fraction as a function of (a) the shape coefficient β (b) the aspect ratio of particles. The particle size distribution is maintained constant (shown in FIG. 6)

From the particle size distribution and the maximum packing fraction of the powder, the Compressible Packing Model (CPM) allows for the computation of a unique shape coefficient β of the powder (equal here to 0.42 as shown in FIG. 7). The shape coefficient β corresponds to the maximum packing fraction of a monodisperse powder with the same particle shape. When dealing with polydisperse powders, the model assumes that, for the same powder, the shape of a particle is independent on the size classes.

In order to study the effect of the shape coefficient on the maximum packing fraction of cocoa, we vary here the shape coefficient and compute from the CPM the corresponding maximum packing fraction while keeping the particle size distribution from FIG. 6.

FIG. 7*a* shows the maximum packing fraction as a function of the shape coefficient for a cocoa powder having a constant particle size distribution computed from CPM. It was noted that an increase of the shape coefficient leads to an increase of the maximum packing fraction of the powder. A shape coefficient equal to 0.64 corresponds to a sphere.

It is shown in literature that particle aspect ratio is one of the main parameters influencing the particle maximum packing fraction. The aspect ratio of these powders were computed from the semi empirical equation developed by Ahmadah et al. (Oumayma Ahmadah, Contrôle de la rhéologie des liants à faibles impacts environnementaux, Université Gustave Eiffel, Thèse 2021) and the maximum packing fraction was plotted as a function of the aspect ratio (Cf. FIG. 9*b*). It was noted that decreasing the aspect ratio of particles while maintaining the particle size distribution constant leads to an increase of the maximum packing fraction.

As described herein, increasing the maximum packing fraction of a powder allows for a decrease of the emulsifier content in a chocolate composition while maintaining the viscosity constant.

These results show that the method of the invention, which utilizes CPM, takes the shape of the particles into account and that the influence of particle shape on packing properties and therefore on chocolate composition ingredient selection is of a critical importance.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A reduced emulsifier or emulsifier-free chocolate composition comprising:

a continuous fat phase, said fat phase comprising a fat and optionally an emulsifier; and at least two particulate materials distributed throughout said fat phase, wherein the at least two particulate materials are selected from the group consisting of sugars, cocoa solids, milk solids, bulking agents, calcium carbonate, nutritional particles, flavorings and mixtures of two or more thereof;

wherein the at least two particulate materials have different D50 particle sizes to each other in the reduced emulsifier or emulsifier-free chocolate composition, said difference being a factor of 6-8, wherein the reduced emulsifier or emulsifier-free chocolate composition comprises a maximum packing fraction greater than or equal to 0.6, wherein the maximum packing fraction of the reduced emulsifier or emulsifier-free composition is at least 1% greater than the maximum packing fraction of an initial chocolate composition, wherein the initial chocolate composition comprises a fat content of between 23 wt. % and about 50 wt. %, wherein the maximum packing fraction of the reduced emulsifier or emulsifier-free composition is at least 1% greater than the maximum packing fraction of the initial chocolate composition, wherein the reduced emulsifier or emulsifier-free chocolate composition comprises reduced emulsifier content relative to the emulsifier content in the initial chocolate composition, and wherein the reduced emulsifier or emulsifier-free chocolate composition comprises substantially identical viscosity to the initial chocolate composition, and wherein the reduced emulsifier or emulsifier-free chocolate composition has a Bingham plastic viscosity value of between 0.1 and 10 Pa·s and a Bingham yield stress of between 1 and 150 Pa, at 40° C.

2. The reduced emulsifier or emulsifier-free chocolate composition according to claim 1 having a solid phase volume x, and a Bingham plastic viscosity value y in Pas at 40° C. or above, where:

x is from 0.4 to 0.7; and $$y<264x^3-330x^2+141x-20.$$

3. The reduced emulsifier or emulsifier-free chocolate composition according to claim 1, having a maximum packing fraction that is greater than or equal to 0.72 for extrusion applications, greater or equal to 0.63 for moulding applications, greater than or equal to 0.64 for enrobing applications, or greater or equal to 0.66 for ice cream applications.

4. The reduced emulsifier or emulsifier-free chocolate composition according to claim 1, wherein the fat phase comprises cocoa butter, cocoa butter equivalents, cocoa butter alternatives, anhydrous milk fat, fractions thereof and/or mixtures of two or more thereof.

5. The reduced emulsifier chocolate composition according to claim 1, wherein the emulsifier is selected from the group consisting of lecithin, soy lecithin, polyglycerol polyricinoleate (PGPR), ammonium phosphatide (AMP), sorbitan tristearate, sucrose polyerucate, sucrose polystearate, and phosphated mono-di-glycerides/diacetyl tartaric acid of mono glycerides.

6. A food product comprising the reduced emulsifier or emulsifier-free chocolate composition according to claim 1.

7. The reduced emulsifier or emulsifier-free chocolate composition according to claim 1, wherein the maximum packing fraction is determined by the particle packing parameters including both particle size distribution and particle shape.

8. The reduced emulsifier or emulsifier-free chocolate composition according to claim 1, wherein the chocolate composition comprises 40%-65% sugar and 5%-40% cocoa solids.

9. The reduced emulsifier or emulsifier-free chocolate composition according to claim 1, wherein the reduced emulsifier or emulsifier-free chocolate composition does not comprise any added emulsifiers.

10. The reduced emulsifier or emulsifier-free chocolate composition according to claim 1, wherein the total fat content of the reduced emulsifier or emulsifier-free chocolate composition is the same as or less than the total fat content of the initial chocolate composition.

11. A method of preparing a reduced emulsifier or emulsifier-free chocolate composition, the method comprising:

(a) providing an initial chocolate composition comprising a continuous fat phase, said fat phase comprising a fat and optionally an emulsifier, wherein the initial chocolate composition comprises a fat content of between 23 wt. % and about 50 wt. %; and at least two particulate materials dispersed throughout the fat phase and the emulsifier, wherein the at least two particulate materials are selected from the group consisting of sugars, cocoa solids, milk solids, bulking agents, calcium carbonate, nutritional particles, flavorings and mixtures of two or more thereof;

(b) measuring the maximum packing fraction and viscosity of the initial chocolate composition; and (c) preparing a reduced emulsifier or emulsifier-free version of the initial chocolate composition by:

i. determining optimized particle packing parameters for the at least two particulate materials of the initial chocolate composition, wherein the optimized particle packing parameters are optimized such that the reduced emulsifier or emulsifier-free chocolate composition has a maximum packing fraction value that is greater than or equal to 0.6, wherein the maximum packing fraction value of the maximum packing fraction of the reduced emulsifier or emulsifier-free composition is at least 1% greater than the maximum packing fraction of the initial chocolate composition, wherein the reduced emulsifier or emulsifier-free composition has a viscosity that is substantially identical to the viscosity of the initial chocolate composition, wherein the reduced emulsifier or emulsifier-free chocolate composition has a Bingham plastic viscosity value of between 0.1 and 10 Pa·s and a Bingham yield stress of between 1 and 150 Pa, at 40° C. and wherein the optimized particle packing parameters include particle size distribution and particle shape;

ii. selecting for the reduced emulsifier or emulsifier-free chocolate composition at least two particulate materials that are identical to the at least two particulate materials of the initial chocolate composition but for having optimized the particle packing parameters, wherein the at least two particulate materials in the reduced fat chocolate composition have different D50 particle sizes to each other, said difference being a factor of 6-8; and iii. combining the selected particulate materials with a fat phase and optionally an emulsifier that are identical to the fat phase and the emulsifier of the initial chocolate composition to provide the reduced emulsifier or emulsifier-free version of the initial chocolate composition, wherein the reduced emulsifier or emulsifier-free chocolate composition comprises reduced emulsifier relative to the initial chocolate composition.

12. The method according to claim 11, wherein the particle packing parameters further comprise the relative amounts of the at least two particulate materials.

13. A reduced emulsifier or emulsifier-free chocolate composition obtained by the method of claim 11.

14. The method according to claim 11, wherein the fat phase comprises cocoa butter, cocoa butter equivalents, cocoa butter alternatives, anhydrous milk fat, fractions thereof and/or mixtures of two or more thereof.

15. The method according to claim 11, wherein the emulsifier is selected from the group consisting of lecithin, soy lecithin, polyglycerol polyricinoleate (PGPR), ammonium phosphatide (AMP), sorbitan tristearate, sucrose polyerucate, sucrose polystearate, and phosphated mono-di-glycerides/diacetyl tartaric acid of mono glycerides.

16. The method according to claim 11, wherein the total fat content of the reduced emulsifier or emulsifier-free chocolate composition is the same as or less than the total fat content of the initial chocolate composition.

17. The method according to claim 11, wherein the chocolate composition comprises 40%-65% sugar and 5%-40% cocoa solids.

18. The method according to claim 11, wherein the reduced emulsifier or emulsifier-free chocolate composition does not comprise any added emulsifiers.

19. A food product comprising the reduced emulsifier or emulsifier-free chocolate composition according to the method of claim 11.

* * * * *